(12) United States Patent
Melic

(10) Patent No.: US 11,959,292 B2
(45) Date of Patent: Apr. 16, 2024

(54) SCAFFOLDING TUBE CLAMP

(71) Applicant: Jonathan Jonny Melic, Burlington (CA)

(72) Inventor: Jonathan Jonny Melic, Burlington (CA)

( * ) Notice: Subject to any disclaimer, the term of this patent is extended or adjusted under 35 U.S.C. 154(b) by 0 days.

(21) Appl. No.: 17/621,294

(22) PCT Filed: Jun. 30, 2020

(86) PCT No.: PCT/CA2020/050911
§ 371 (c)(1),
(2) Date: Dec. 21, 2021

(87) PCT Pub. No.: WO2021/000042
PCT Pub. Date: Jan. 7, 2021

(65) Prior Publication Data
US 2022/0349191 A1   Nov. 3, 2022

Related U.S. Application Data

(60) Provisional application No. 62/941,093, filed on Nov. 27, 2019, provisional application No. 62/869,812, filed on Jul. 2, 2019.

(51) Int. Cl.
*E04G 7/16* (2006.01)
*F16B 7/04* (2006.01)

(52) U.S. Cl.
CPC ............... *E04G 7/16* (2013.01); *F16B 7/044* (2013.01)

(58) Field of Classification Search
CPC ... E04G 7/16; E04G 7/14; F16B 2/065; F16B 7/044; F16B 7/048; F16B 7/0493; F16B 25/0073

(Continued)

(56) References Cited

U.S. PATENT DOCUMENTS 1,539,826 A * 6/1925 Boutelle ............... F16B 5/0275
  411/413
2,165,221 A * 7/1939 Burton ..................... E04G 7/24
  269/45

(Continued)

FOREIGN PATENT DOCUMENTS

CN   2057485 U    5/1990
CN   203891453 U   10/2014

(Continued)

OTHER PUBLICATIONS

International Search Report and Written Opinion for PCT/CA2020/050911 dated Sep. 10, 2020.

(Continued)

*Primary Examiner* — Matthew R McMahon
(74) *Attorney, Agent, or Firm* — Crowe & Dunlevy, P.C.

(57) ABSTRACT

A scaffolding tube clamp having a pair of body portions defining a top and a base that are hinged together and receivable about a scaffolding tube. A rotatable bolt is received through a hole in the top a hole in the base portion. The bolt has a lower end with engagement means to releasably secure the bolt to the base. The bolt's head has a lower surface that is engageable with a surface on the top. The lower surface of the head, and the surface of the top that is engaged thereby, have complimentary ramped configurations such that when the bolt is rotated the ramps engage, resulting in the ramps moving the top toward the base. In an alternate embodiment the bolt is threaded with two sets of threads that have different diameters and different pitches and that are threadably received within the holes in the top and bottom.

7 Claims, 48 Drawing Sheets

(58) Field of Classification Search
USPC .......................................... 411/413, 415, 307
See application file for complete search history.

(56) References Cited

U.S. PATENT DOCUMENTS

| | | | | |
|---|---|---|---|---|
| 3,167,346 | A * | 1/1965 | Miller | B66C 1/36 |
| | | | | 114/230.3 |
| 3,876,318 | A * | 4/1975 | Crispell | F16B 21/00 |
| | | | | 403/362 |
| 4,443,128 | A * | 4/1984 | Yamamoto | F16M 11/08 |
| | | | | 403/388 |
| 4,728,202 | A * | 3/1988 | LaRou | F16D 1/0864 |
| | | | | 384/537 |
| 4,969,374 | A * | 11/1990 | Borromeo | F16B 7/048 |
| | | | | 403/191 |
| 5,040,916 | A * | 8/1991 | Morgan | E04G 7/26 |
| | | | | 403/387 |
| 5,427,465 | A * | 6/1995 | Sato | E04G 7/16 |
| | | | | 403/385 |
| 5,536,127 | A * | 7/1996 | Pennig | A61B 17/863 |
| | | | | 411/397 |
| 5,997,012 | A * | 12/1999 | Brian | B23B 31/201 |
| | | | | 279/43.3 |
| 6,125,526 | A * | 10/2000 | Wierzchon | F16B 5/0275 |
| | | | | 411/335 |
| 6,702,509 | B2 * | 3/2004 | Rogers | E04G 7/14 |
| | | | | 403/385 |
| 6,786,302 | B2 * | 9/2004 | Liew | E04G 7/14 |
| | | | | 248/316.5 |
| 6,789,647 | B1 * | 9/2004 | Yeh | A62B 1/14 |
| | | | | 182/100 |
| 7,665,699 | B2 * | 2/2010 | Oddsen, Jr. | F16B 2/10 |
| | | | | 248/220.21 |
| 8,683,656 | B2 * | 4/2014 | Mizuguchi | F16B 2/10 |
| | | | | 16/422 |
| 10,500,699 | B2 * | 12/2019 | Chang | B25B 5/003 |
| 2018/0187704 | A1 * | 7/2018 | Chang | F16M 11/041 |
| 2019/0160632 | A1 | 5/2019 | Chang | |

FOREIGN PATENT DOCUMENTS

| | | | | |
|---|---|---|---|---|
| CN | 108326778 A | | 7/2018 | |
| FR | 2337238 A1 * | | 7/1977 | E04G 7/16 |
| WO | WO-2008107498 A1 * | | 9/2008 | B62K 21/12 |

OTHER PUBLICATIONS

International Preliminary Report on Patentability, corresponding PCT/CA2020/050911 dated Dec. 28, 2021.
EPO Search Report Application No. 20834684.1-1005/3994321 PCT/CA2020/050911.
Office Action Chinese Patent Application No. 202080062044.0.

* cited by examiner

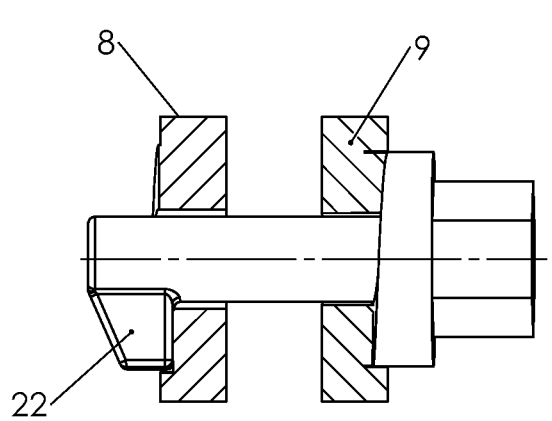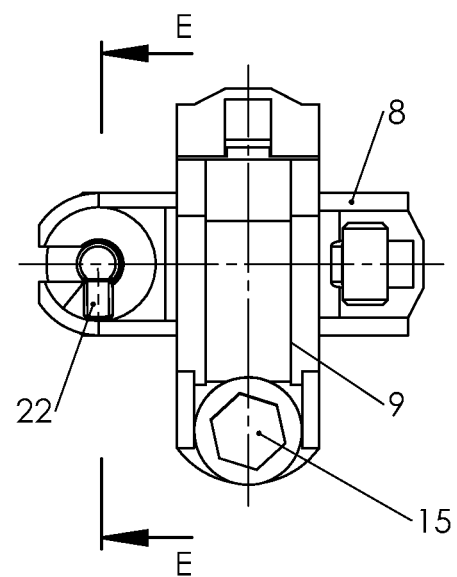
Fig.16b
Fig.16a

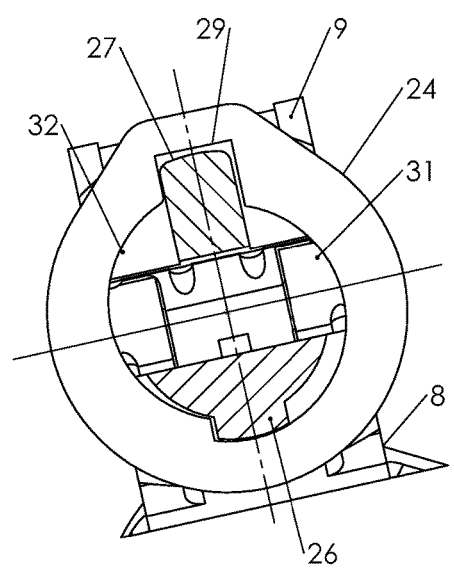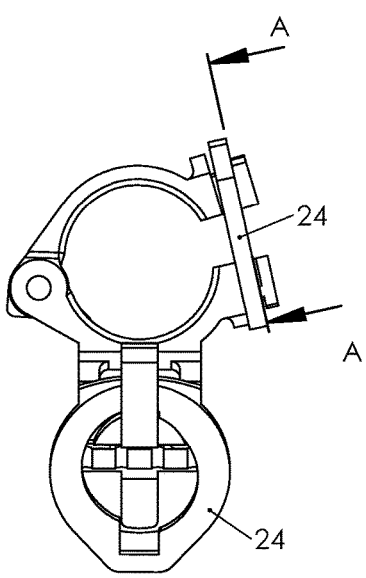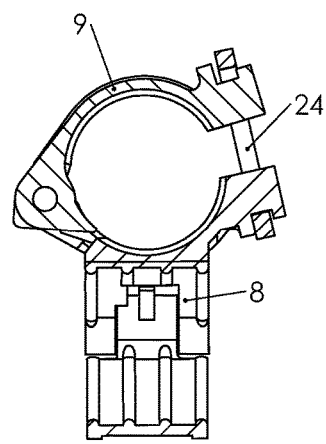
Fig.28b
Fig.28a
Fig.28c

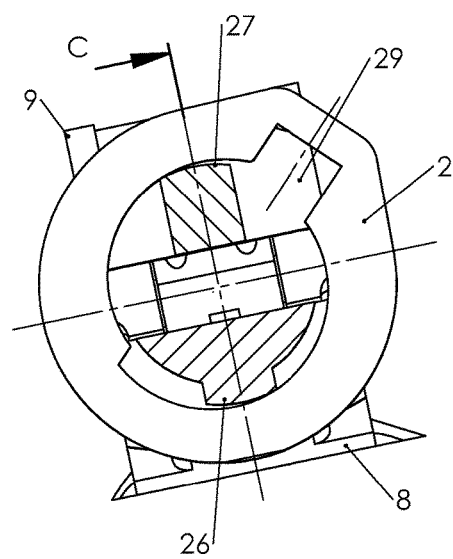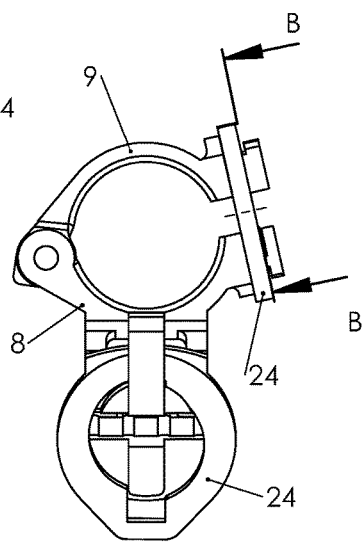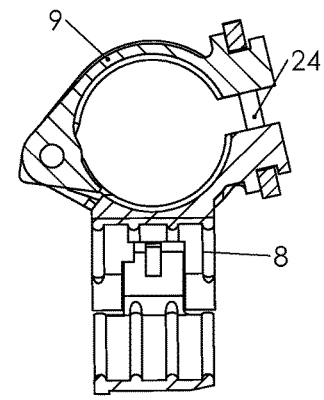
Fig.30a
Fig.30c
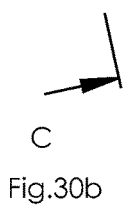
Fig.30b

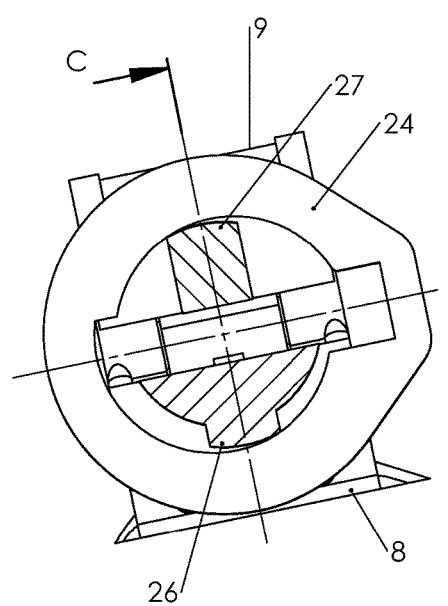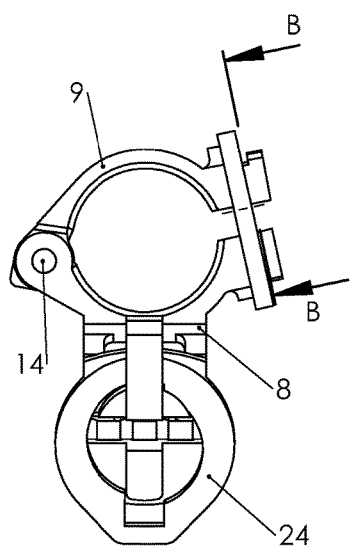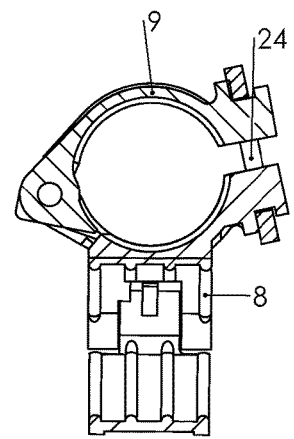
Fig.31a
Fig.31c
Fig.31b

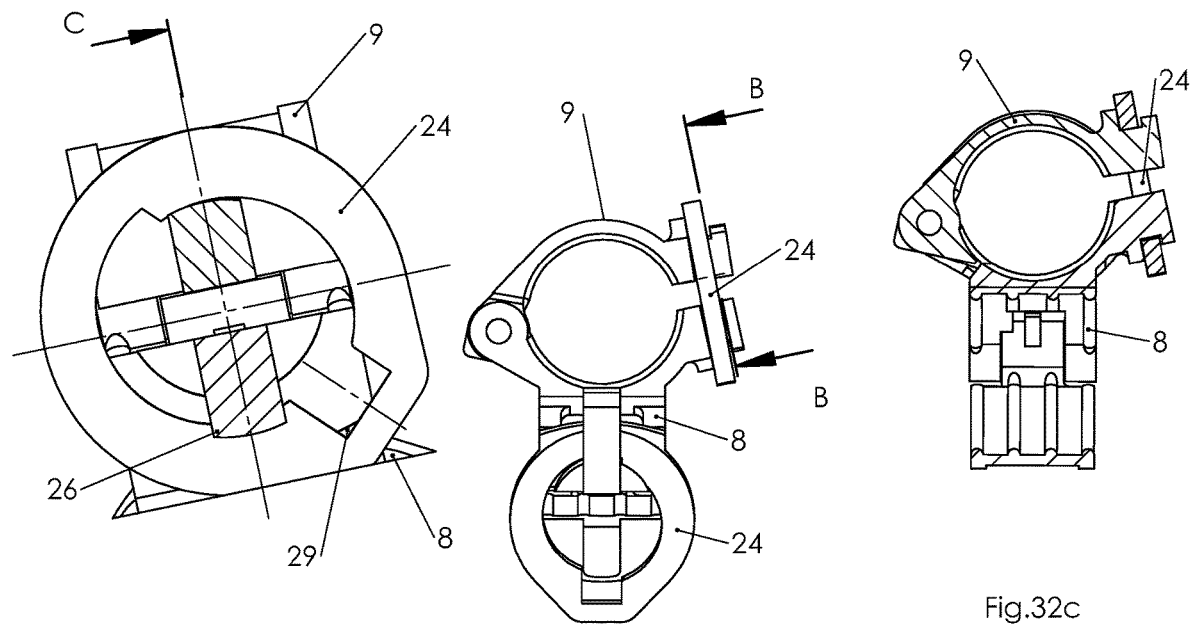
Fig.32a
Fig.32c
Fig.32b

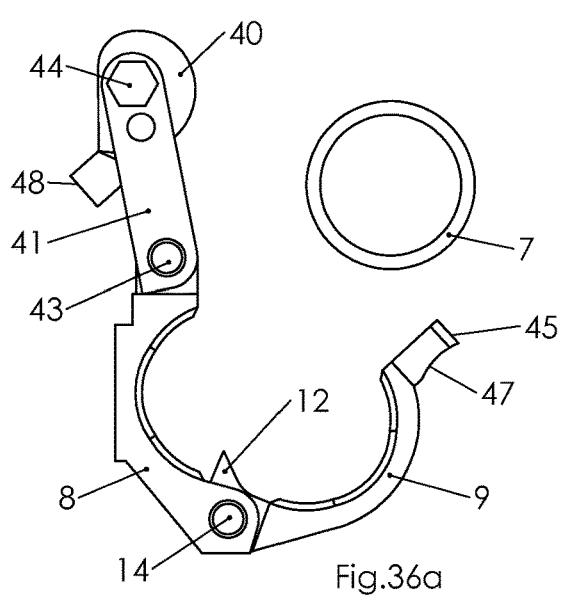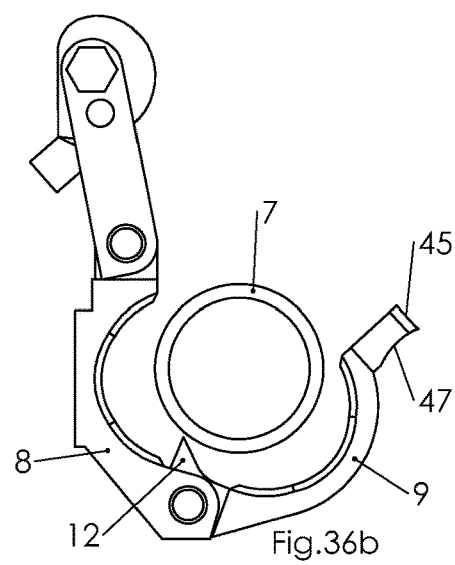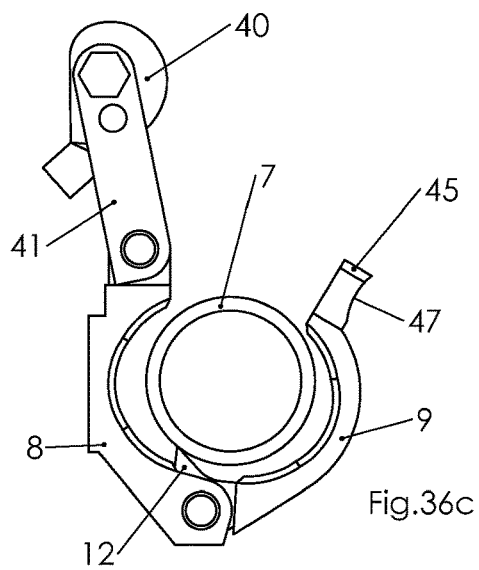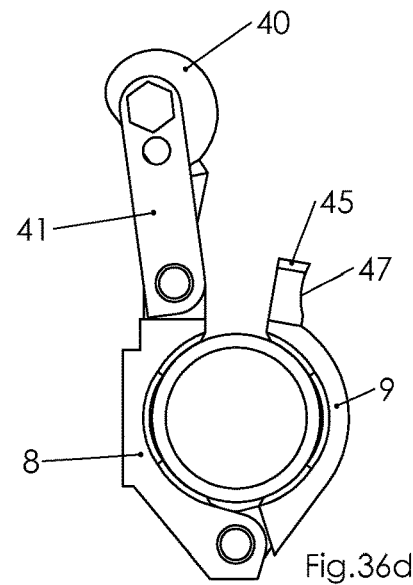
Fig.36a Fig.36b Fig.36c Fig.36d
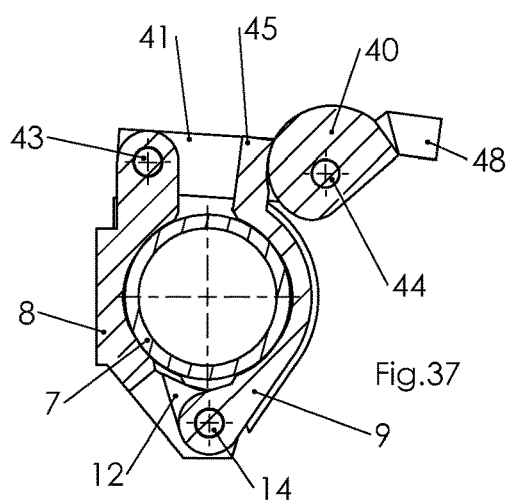
Fig.37

SECTION A-A

SCAFFOLDING TUBE CLAMP

FIELD

This invention relates generally to clamps that may be used to join or couple together pipes or tubing. In one embodiment, the pipes or tubing are in the form of scaffolding tubes.

BACKGROUND

Scaffolding is used in a wide variety of applications, including, but not limited to, multi-story building construction, bridge construction, and the erection of temporary or semi-permanent bleachers, stages, etc. Often scaffolding is formed from a series of pipes or tubes that are clamped together to form a rigid structure of, at times, considerable height. For obvious safety reasons, the manner in which scaffolding tubing is secured together is important.

Many styles of clamps are known for coupling or joining together scaffolding tubes. The primary types of known scaffolding tube couplings are the "nut and bolt" type, as exemplified by U.S. Pat. No. 6,786,302, and the "wedge" type, as exemplified by U.S. Pat. No. 6,739,647. Unfortunately, each of those styles of clamps suffers from certain disadvantages, including the tendency for premature wear, a susceptibility to rusting and degradation, a tendency to loosen under vibrational forces, etc. There is therefore a need for an improved scaffolding tube clamp.

SUMMARY

In accordance with the invention, there is provided a scaffolding tube clamp comprising at least one pair of body portions, each pair of body portions comprising a base and a top, each base and top having a first end hingedly connected to one another to permit the base and top to be rotatably received about the exterior surface of a scaffolding tube, a rotatable bolt receivable through a first hole positioned in a second end of the top and through a second hole in a second end of the base, when the bolt is received through the first and second holes rotation of the bolt in a first direction connects the second ends of the top and base and moves the second ends closer to one another in a clamping arrangement about a scaffolding tube received therebetween, and rotation of the bolt in a second opposite direction releases the connection between the second ends of the top and the base permitting their rotational movement about the hinged connection, the bolt having a lower end with engagement means to releasably secure the bolt to the second end of the base, the bolt including a head that is larger than the first hole, the head having a lower surface that is engageable with a surface on the second end of the top when the bolt is received through the first hole, the lower surface of the head, and the surface of the second end of the top that is engaged thereby, having complimentary ramped configurations such that when the bolt is engaged with the second end of the base rotation of the bolt in the first direction causes an engagement of the ramp configurations resulting in the ramp configurations moving the second end of the top portion toward the second end of the base.

In another embodiment there is provided a scaffolding tube claim comprising at least one pair of body portions, each pair of body portions comprising a base and a top, each base and top having a first end hingedly connected to one another to permit the base and top to be rotatably received about the exterior surface of a scaffolding tube, a rotatable bolt engageable with a first hole positioned in a second end of the top and engageable with a second hole in a second end of the base, when the bolt is engaged with the first and second holes rotation of the bolt in a first direction connects the second ends of the top and base and moves the second ends closer to one another in a clamping arrangement about a scaffolding tube received therebetween, and rotation of the bolt in a second opposite direction releases the connection between the second ends of the top and the base permitting their rotational movement about the hinged connection, the bolt having a head and a threaded shaft, the shaft having a first threaded portion with a first thread located adjacent to the head, the shaft having a second threaded portion with a second thread at a lower end of the bold, the first hole having threads complimentary to the first thread and the second hole having threads complimentary to the second thread, the first and second threads having different pitches.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 3 is a view subsequent to FIG. 7 wherein the bolt has been rotated by approximately 30°.

FIG. 14b is a sectional view along the line B-B of FIG. 14a.

FIG. 15b is a sectional view taken along the line C-C of FIG. 15a.

FIG. 16a is a view similar to FIG. 14a with the bolt rotated by approximately 90°.

FIG. 16b is a sectional view taken along the line E-E of FIG. 16a.

FIG. 17b is a sectional view taken along the line A-A of FIG. 17a.

FIG. 18b is a sectional view taken along the line F-F of FIG. 18a.

FIG. 19b is a sectional view taken along the line A-A of FIG. 19a.

FIG. 28a is a side view of the scaffolding tube clamp of FIG. 23 in a closed position wherein the removable ring has not yet been rotated.

FIG. 28b is a sectional view taken along the line A-A FIG. 28a.

FIG. 28c is a sectional view taken along the line C-C of the FIG. 28b.

FIG. 29b is a sectional view taken along the line A-A of FIG. 29a.

FIG. 30a is a view similar to FIG. 28a wherein the removable ring has been rotated by approximately 45°.

FIG. 30b is a sectional view taken along the line B-B of FIG. 30a.

FIG. 30c is a sectional view taken along the line C-C FIG. 30b.

FIG. 31a is a view similar to FIG. 28a wherein the removable ring has been rotated by approximately 90°.

FIG. 31b is a sectional view taken along the line B-B of FIG. 31a.

FIG. 31c is a sectional view taken along the line C-C FIG. 31b.

FIG. 32a is a view similar to FIG. 28a wherein the removable ring has been rotated by approximately 135° and is in its locked position.

FIG. 32b is a sectional view taken along the line B-B of FIG. 32a.

FIG. 32c is a sectional view taken along the line C-C FIG. 32b.

FIGS. 36a through 36d are side views of one of the clamping members of the scaffolding tube clamp of FIG. 33 demonstrating its progressive movement as it is received about the exterior surface of a scaffolding tube.

FIG. 37 is a side sectional view of the clamping member of FIG. 36 fully engaged about a scaffolding tube and in a partially locked configuration.

FIG. 44 is an upper side perspective view of a clamping member of an alternate embodiment of the scaffolding tube clamp shown in FIG. 36a.

DESCRIPTION

Figure 1:
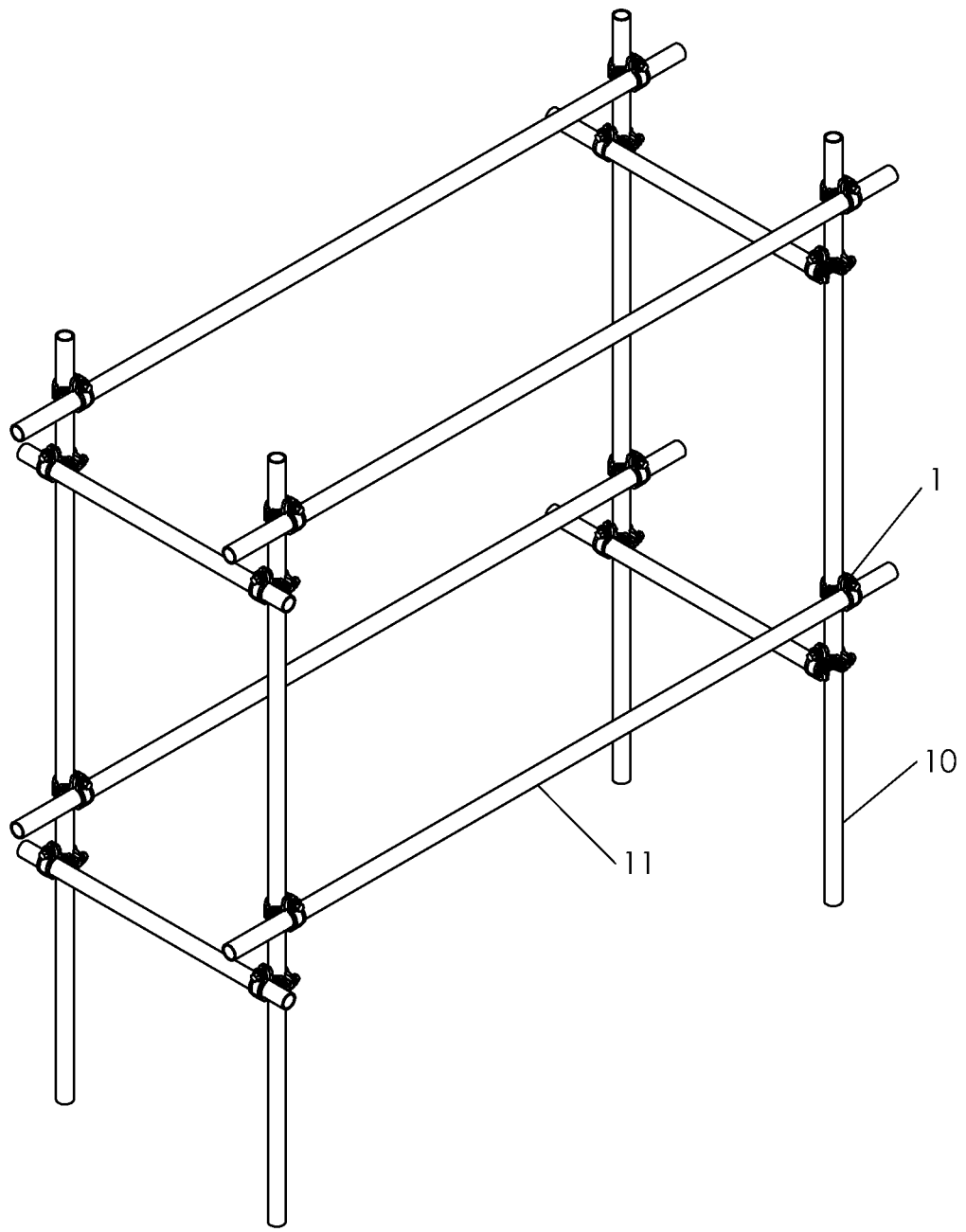
FIG. 1 is an upper side perspective view of a scaffolding showing a scaffolding tube clamp in accordance with a first embodiment of the invention.
Figure 2:
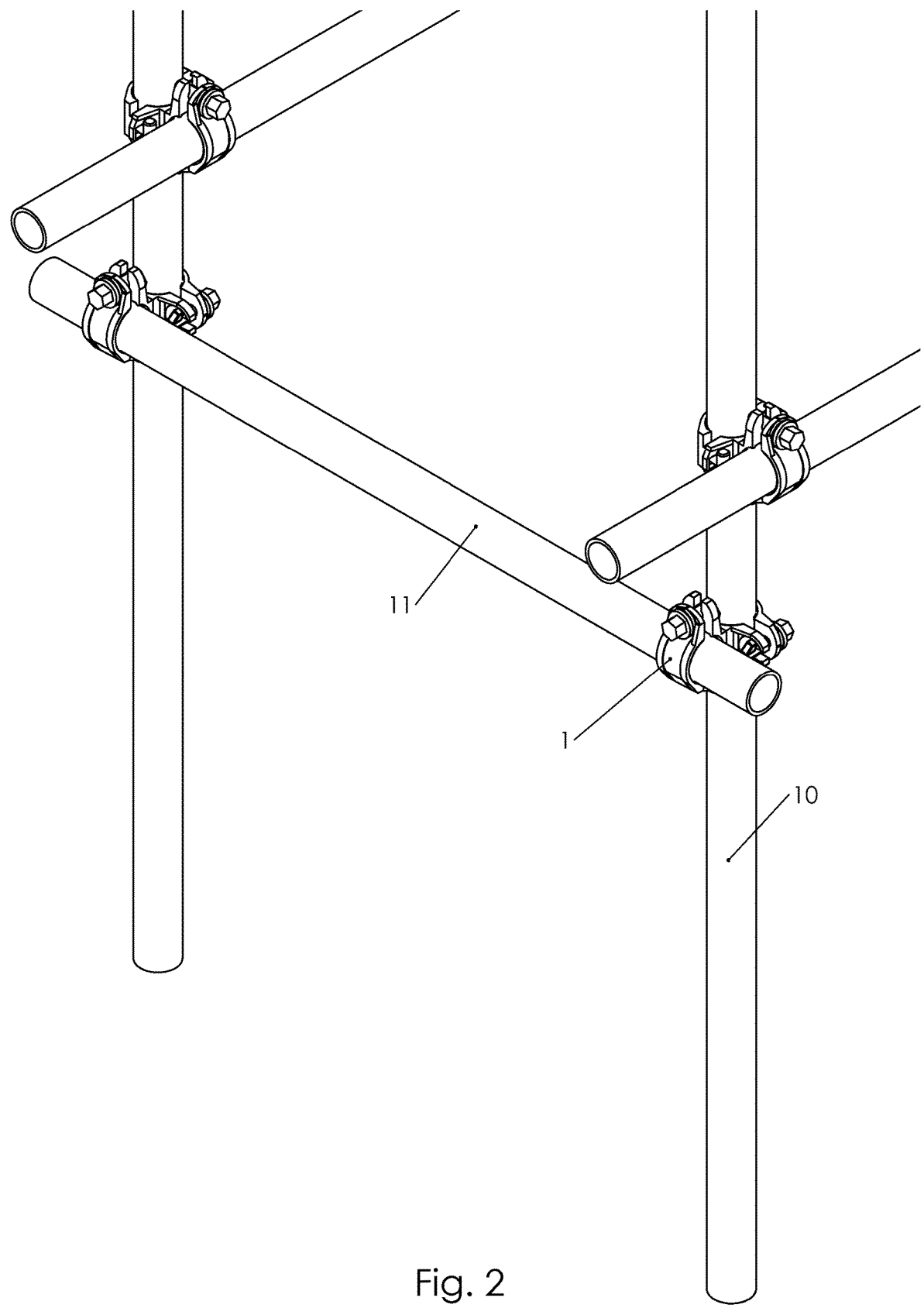
FIG. 2 is an enlarged view of the scaffolding tubes and scaffolding tube clamps of FIG. 1.
Figure 3:
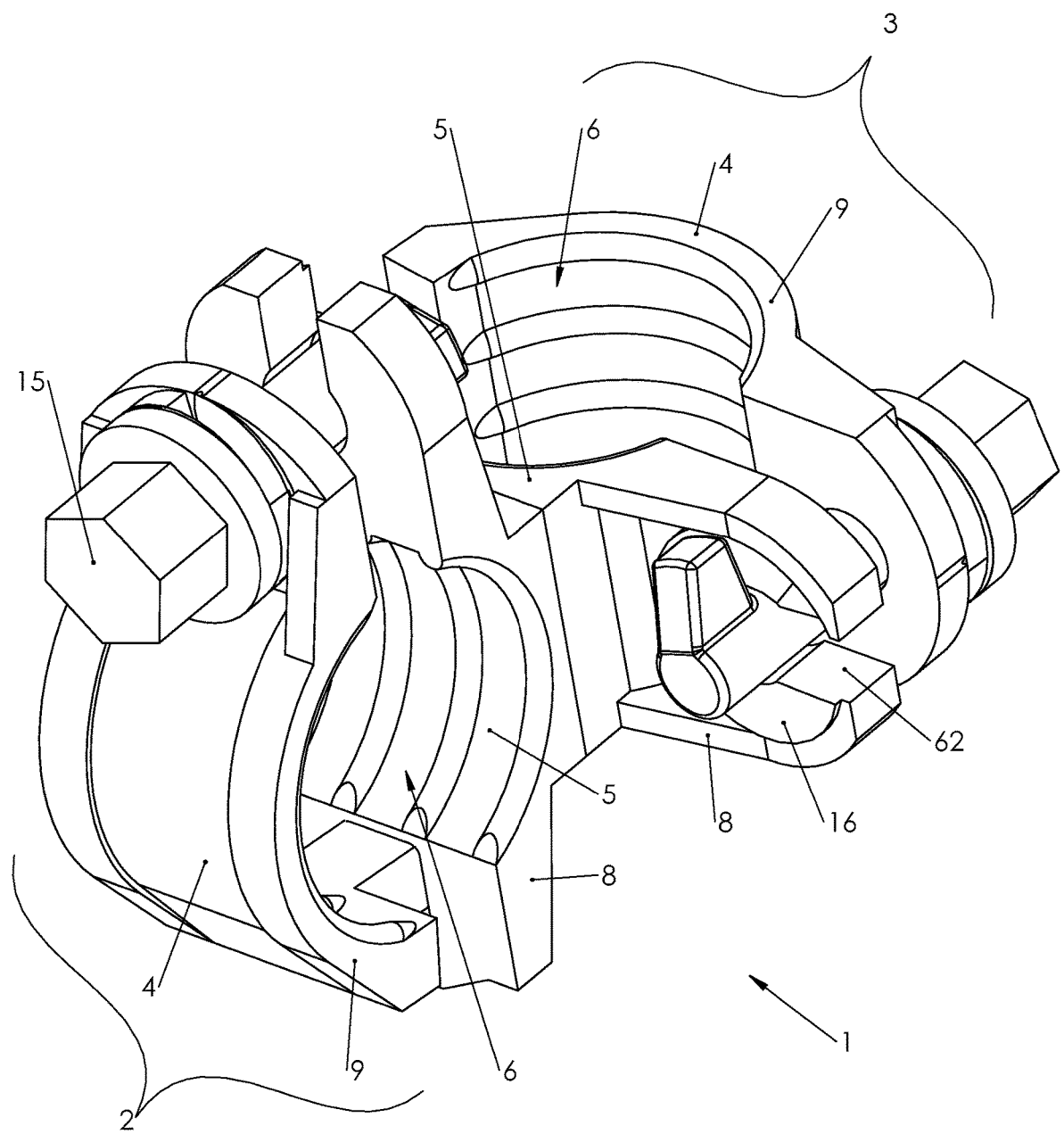
FIG. 3 is an upper side perspective view of the scaffolding tube clamp of FIG. 2 in a closed configuration.
Figure 4:
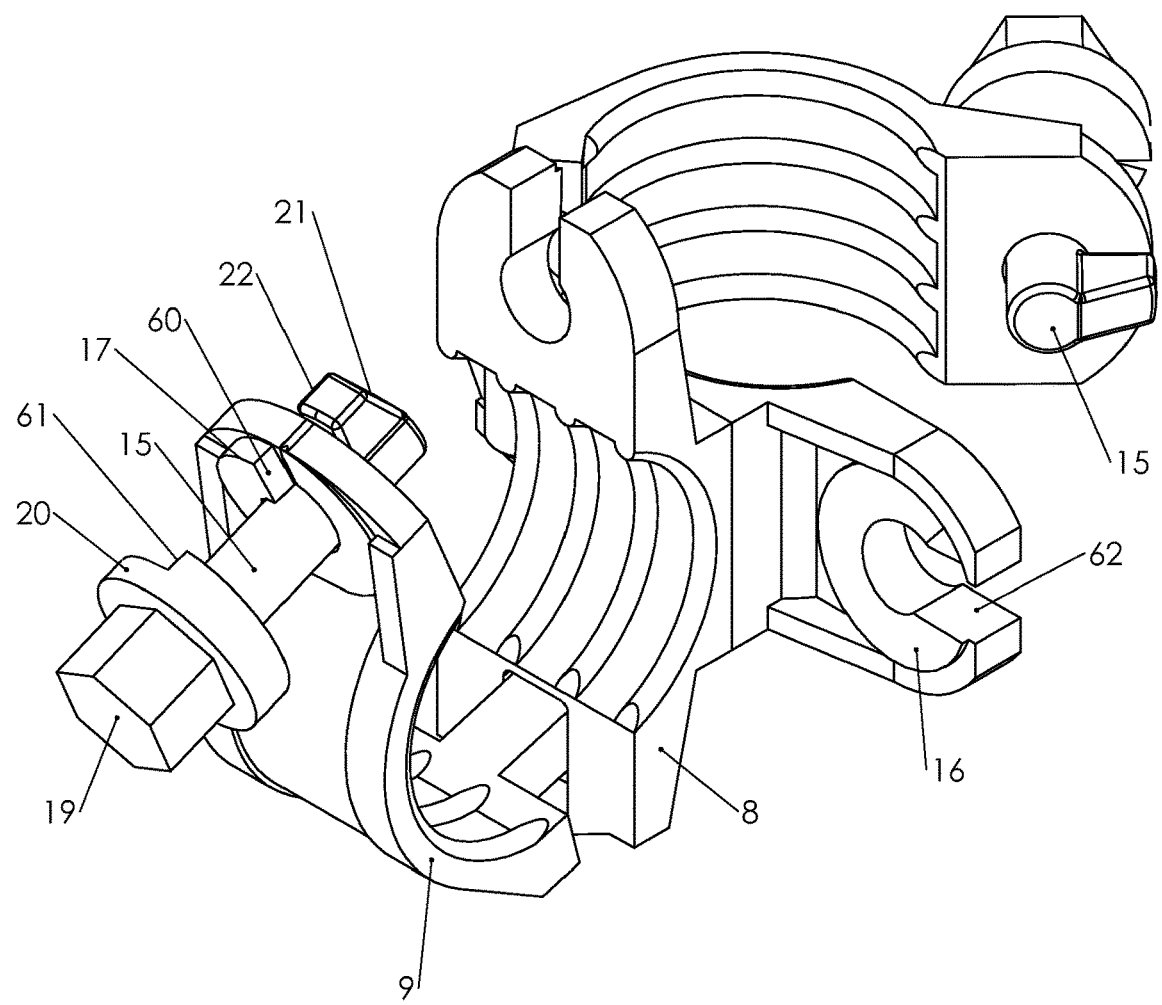
FIG. 4 is a view of the scaffolding tube clamp in FIG. 3 shown in an open position.
Figure 5:
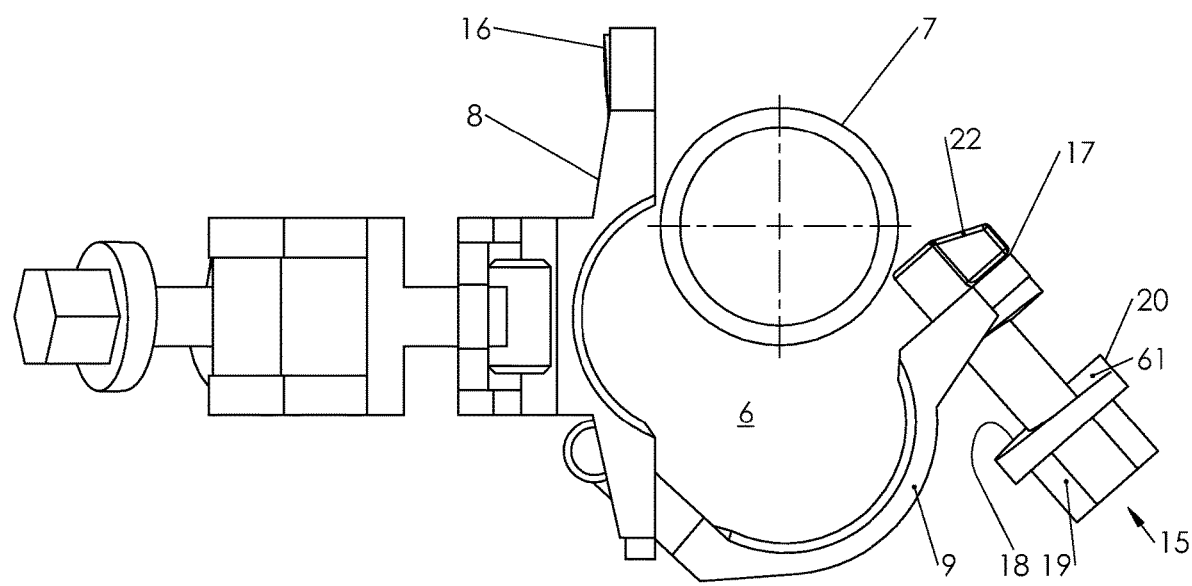
FIG. 5 shows the scaffolding tube clamp of FIG. 4 immediately prior to being received about a scaffolding tube.
Figure 6:
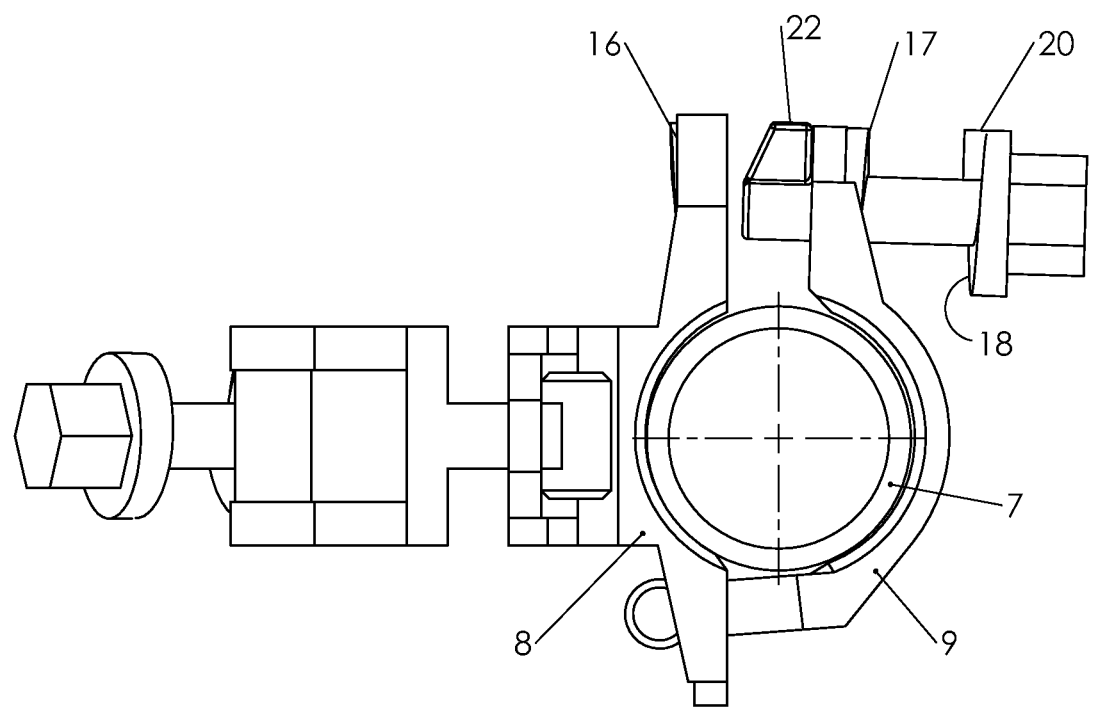
FIG. 6 is a view subsequent to FIG. 5 wherein the clamp is about to be closed around the scaffolding tube.
Figure 7:
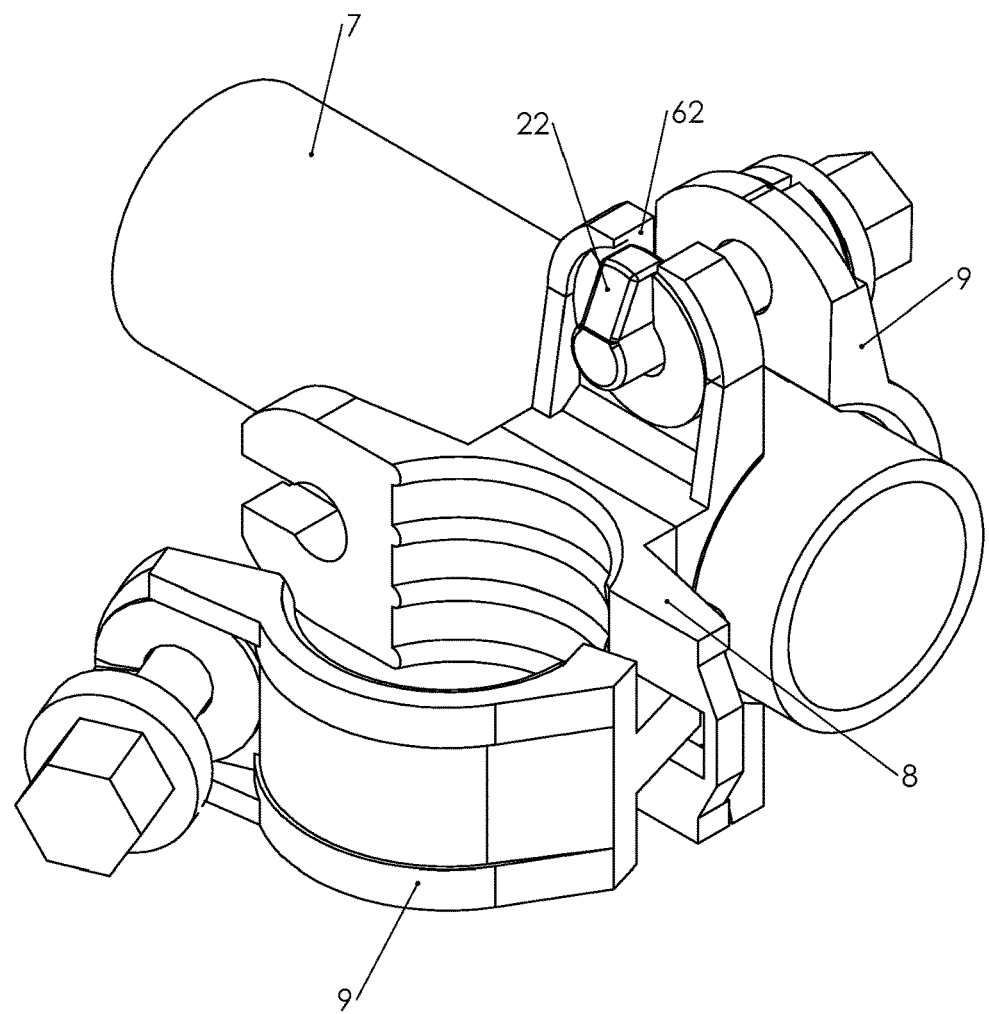
FIG. 7 is an upper perspective view of the clamp shown in FIG. 6 with the bolt of the scaffolding tube clamp about to be rotated.
Figure 8:
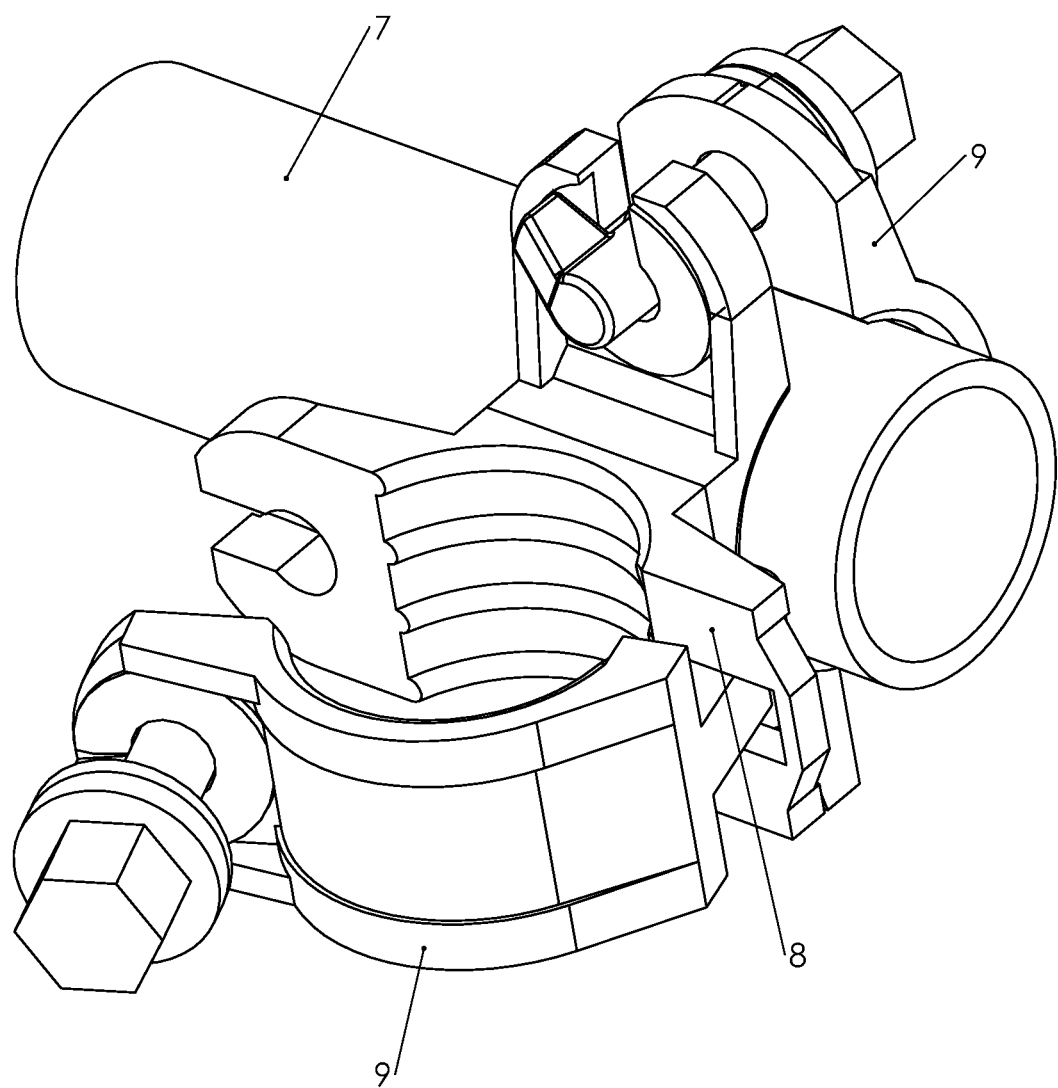
Figure 9:
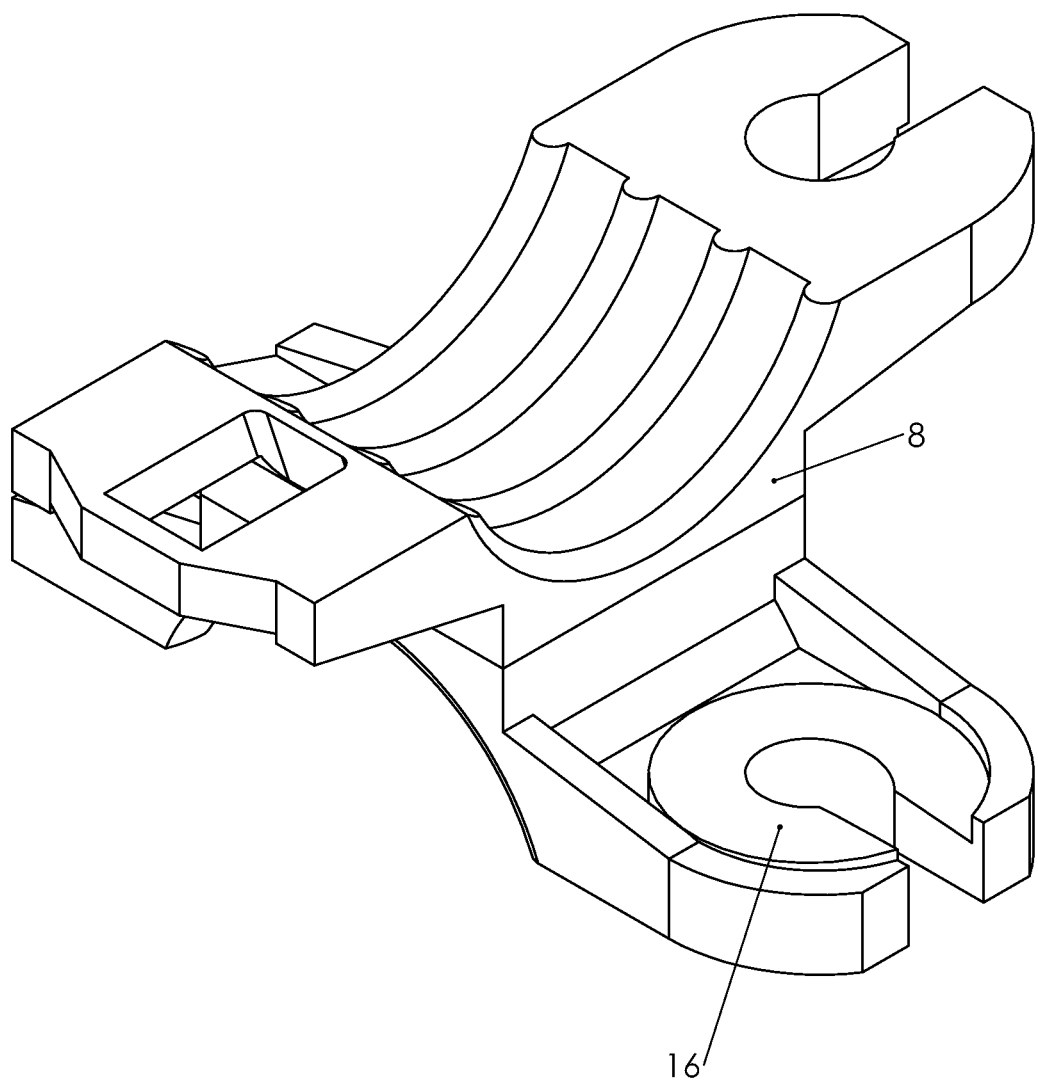
FIG. 9 is an upper perspective view of the base portion of the scaffolding tube clamp of FIG. 3.
Figure 10:
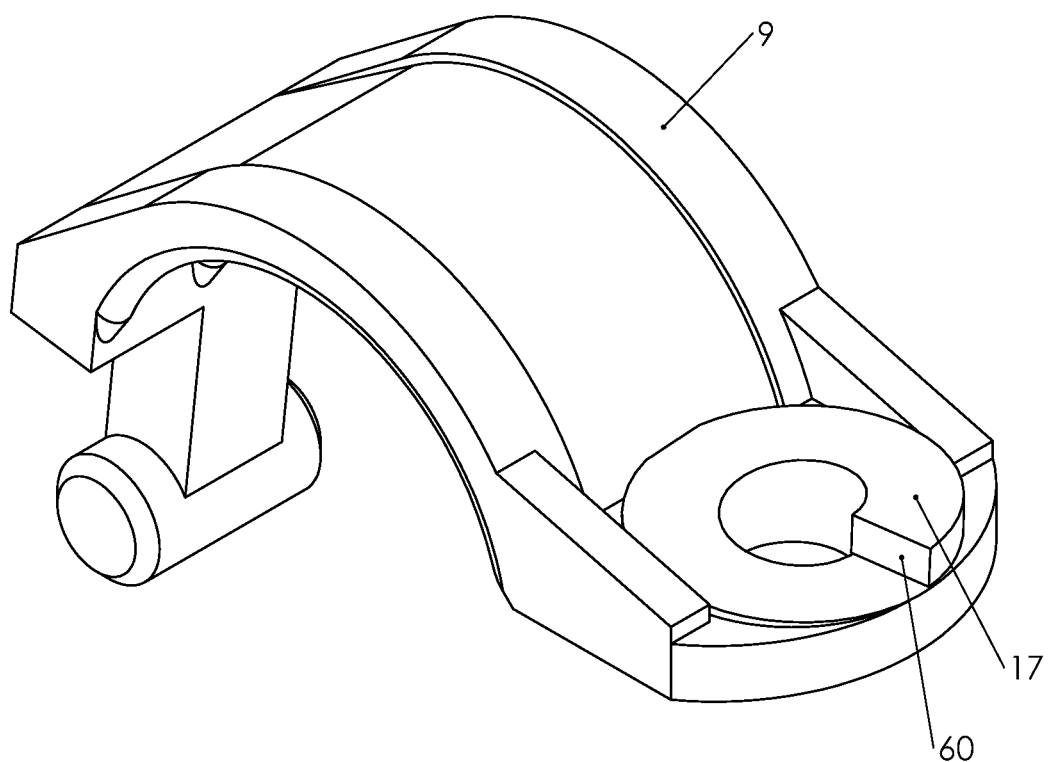
FIG. 10 is an upper perspective view of one of the top portion of the scaffolding tube clamp of FIG. 3.
Figure 11:
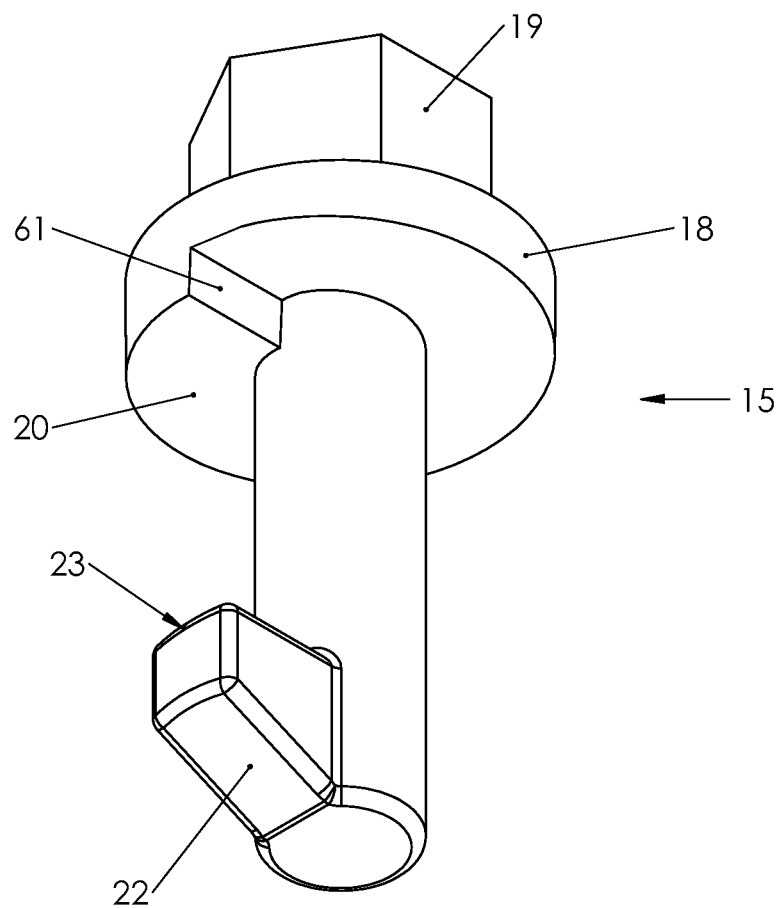
FIG. 11 is a perspective view of the bolt of the scaffolding tube clamp of FIG. 3.
Figure 12:
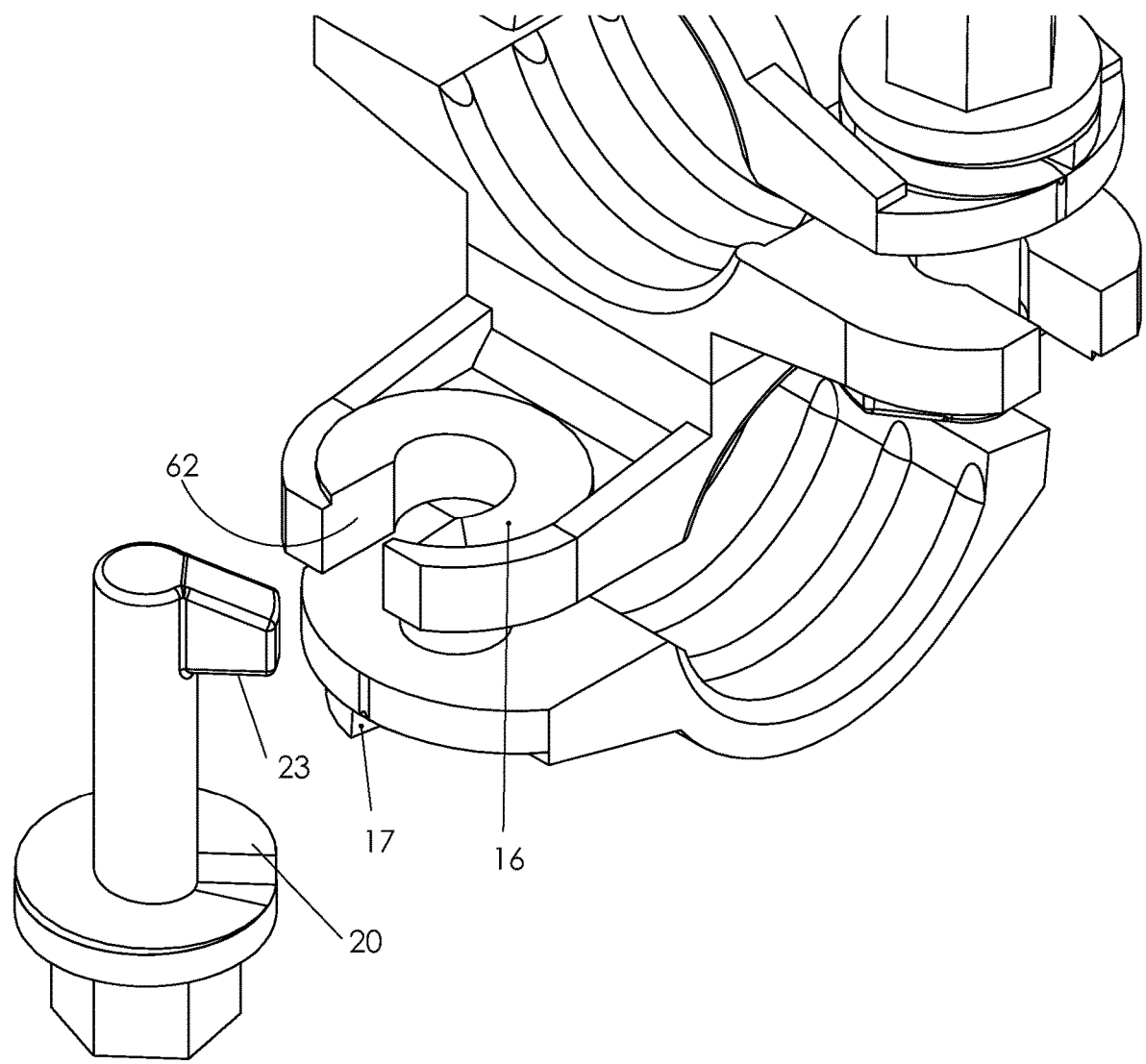
FIG. 12 is a partially exploded view of the scaffolding tube clamp of FIG. 3.
Figure 13:
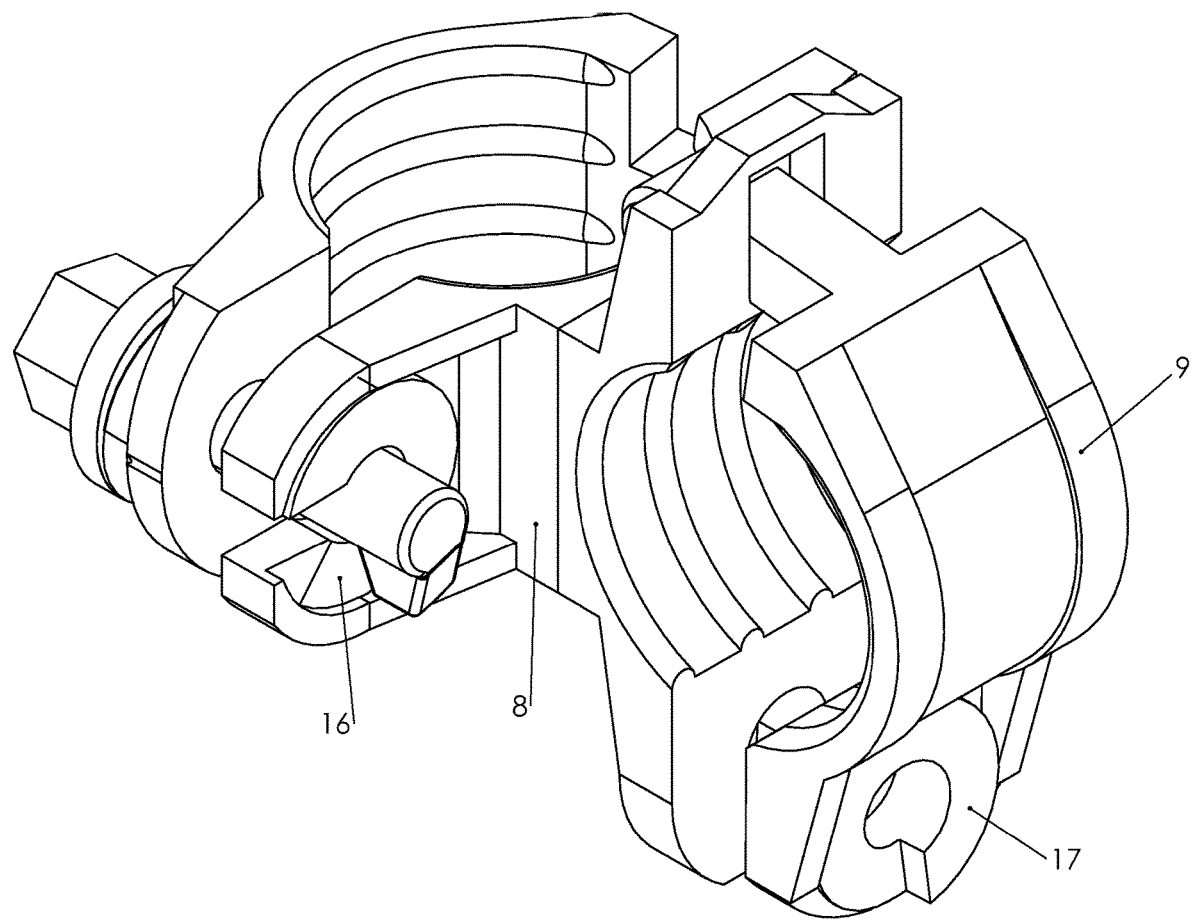
FIG. 13 is an alternate perspective view of the exploded view of FIG. 12.
Figure 13:
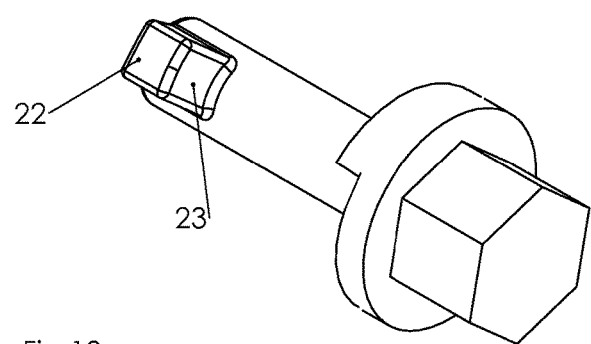
Figure 14A:
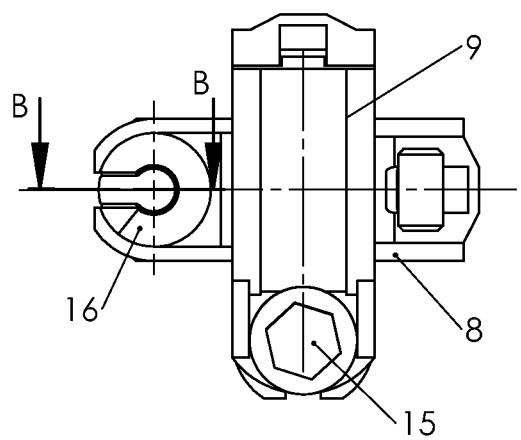
FIG. 14a is a plan view of the scaffolding tube clamp of FIG. 3 in a closed configuration prior to rotation of the bolt.
Figure 14B:
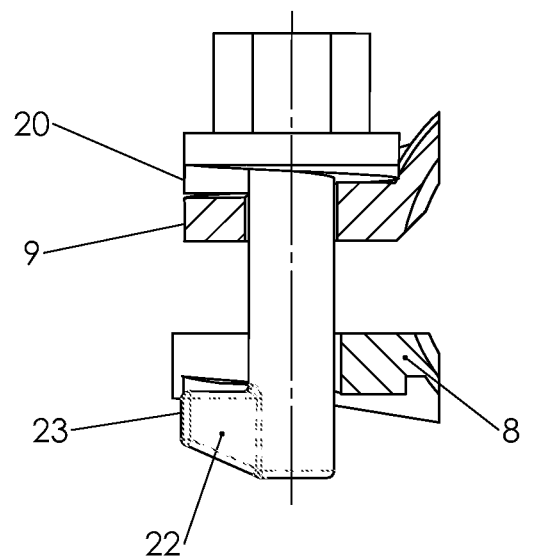
Figure 15B:
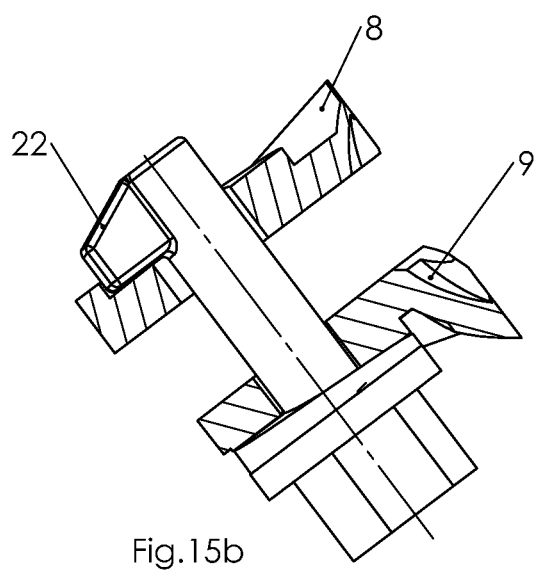
Figure 15A:
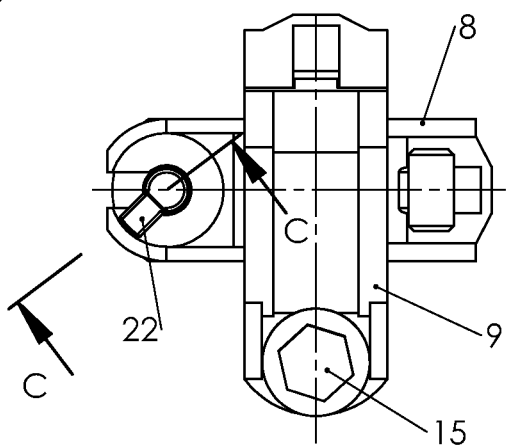
FIG. 15a is a view similar to FIG. 14a wherein the bolt has been rotated by approximately 45°.
Figure 17B:
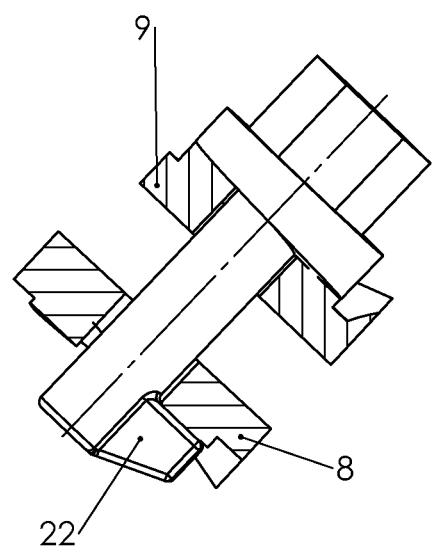
Figure 17A:
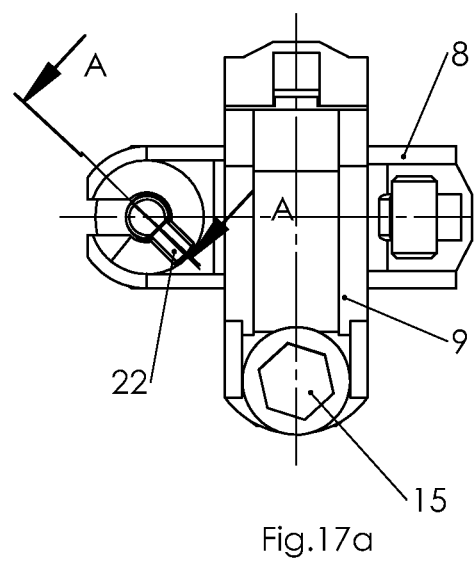
FIG. 17a is a view similar to FIG. 14a with the bolt rotated by approximately 135°.
Figure 18B:
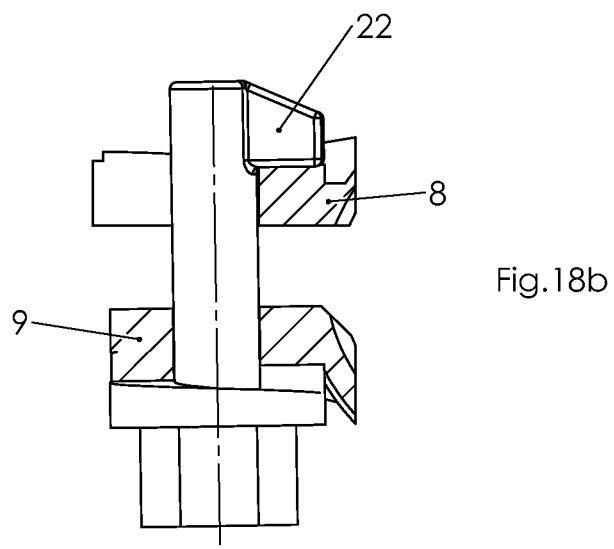
Figure 18A:
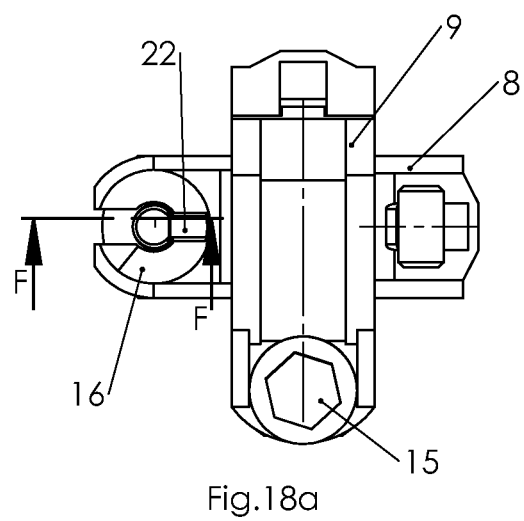
FIG. 18a is a view similar to FIG. 14a with the bolt rotated by approximately 180°.

The present invention may be embodied in a number of different forms. The specification and drawings that follow describe and disclose some of the specific forms of the invention.

Embodiments of the scaffolding tube clamp in accordance with the present invention are shown in the attached drawings. FIGS. 1 through 19b show a first embodiment. FIGS. 20 through 32c show a second embodiment.

FIGS. 33 through 46 show a third embodiment, and some adaptations of that embodiment.

FIGS. 47 through 53 show a further embodiment and adaptations.

As shown, a clamp assembly 1 may consist generally of two clamping members 2 and 3, secured together at approximately 90° and each capable of being received about the exterior surface of a scaffolding tube. Each clamp member includes a pair of curved body portions 4 and 5 that are hinged at first ends in order to form a generally circular cross-sectional enclosure or opening 6 within which can be received a scaffolding tube 7. In an embodiment one of the pair of body portions comprises a base 8 and the other comprises a top 9. Two bases may be secured together to hold two lengths of tubing at approximately 90 degrees to one another. For example, clamp assembly 1 may be secured about a vertically oriented tube 10 and an adjacent generally horizontally oriented tube 11.

In one aspect, the rotatable top 9 may include a tab 12 such that inserting the scaffolding tube into the circular enclosure applies a downwardly directed force to the tab, encouraging the curved body portion to rotate to a closed position where both curved body portions generally encompass the exterior surface of tubing 7. As shown more particularly in FIGS. 23 and 24, tab 12 is positioned on rotating sleeve 13 that is mounted about pin or axle 14 to permit top 9 to rotate relative to base 8. As a tube 7 is inserted within circular opening 6 the exterior surface of the tube will contact tab 12, helping to encourage sleeve 13, together with top 9, to rotate about pin 14 toward a closed configuration. It will be appreciated that this interaction between tab 12 and tube 7 will help to assist in "closing" the clamp during assembly of the scaffolding and will help to simplify the process that an operator needs to complete in order to secure the tubing within the opening of the clamp.

With the scaffold tubing 7 in place within the circular enclosure 6 formed by rotating top 9 relative to base 8 about the hinged connection at their respective first ends, a bolt 15 may be inserted through a first opening or hole in a second end of rotatable top 9 and a second complimentary opening or hole in a second end of base 8, and then rotated to lock the two curved portions together, thereby securely holding the scaffold tube in place. In one aspect of the invention bolt 15 locks the two curved body portions together through interaction of one or more ramped surfaces. For example, in the particular embodiment shown in FIGS. 3 through 19D base 8 includes a ramped surface 16 and top 9 includes ramped surface 17. Bolt 15 includes a ramped surface 20 on the inside portion 18 of its head 19. As will be appreciated from an understanding of the description that follows, ramped surface 20 will be complimentary to ramped surface 17. Head 19 will be larger than the opening or hole in top 9. The opposite end 21 of the bolt includes an arm member 22 that extends outwardly, approximately perpendicular to the longitudinal axis of the shaft of the bolt. When bolt 15 is inserted through the first and second openings or holes in base 8 and top 9 and rotated, the interior surface 23 of arm 22 will contact ramp 16 causing surface 23 to ride along ramp 16, drawing the head of the bolt, and thus top 9, closer to base 8 and moving the clamp into a "closed" or "locked" configuration. Similarly, as the bolt is rotated ramped surface 20 on head 19 will engage ramped surface 17 on top 9 to effectively drive top 9 away from head 19 and closer to base 8 (ie. by effectively expanding the distance between head 19 and top 9 on account of the interaction of the two ramped surfaces). This action further compresses the two portions of the clamp member about the exterior surface of the tube, effectively locking the clamp about the tube. Rotating the bolt in the opposite direction unlocks the tube from the clamp. The second hole or opening in base 8 is preferably equipped with a keyway opening or slot 62 to permit the passage of arm 23 therethrough such that rotation of the bolt when the arm is received through the slot 62 will cause the bolt to be retained within the hole in base 8.

In alternate embodiments of the invention the relative position of the bolt with respect to the top and base may be reversed such that the head of the bolt bears against the base.

In the case of some jurisdictions, the relative angle of threads on bolts that secure together scaffolding tubes must not exceed a predefined limit in order to help ensure that scaffolding clamps do not readily loosen when exposed to vibrational forces (through construction, wind application, earthquake, etc.). The applicant has found that through incorporating caromed or ramped surfaces as described herein, it is able to provide a solid and readily operable mechanism that draws together the outer or second ends of the curved body portions with a minimal rotation of the bolt, while still maintaining a relatively low angular degree of the connecting mechanism. That is, in the case of traditionally used threaded bolts, significant rotation of the bolt is necessary in order to tighten it to enable the two curved surfaces to be drawn together. Constructing the bolt in a fashion that causes a significant longitudinal shortening of the bolt without excessive rotation necessitates the use of a relatively high pitch thread, which in some instances may exceed tolerable limits that are in place to prevent loosening when exposed to vibrational forces. The ramped or cammed surface of bolt 15 and/or base 15 and top 9 in the present invention helps to avoid that scenario. In one embodiment the applicant has found that ramps having an inclination of 3 degrees or less perform their required function while remaining within the tight legislative requirements of certain jurisdictions. Further, the combination of the interaction of ramped surfaces 17 and 20, and surface 23 with ramp 16, together present a means to quickly lock and unlock the clamp while helping to minimize the likelihood of vibrational loosening.

Ramped surfaces 17 and 20 include vertical portions 60 and 61, respectively. In the particular embodiment shown, vertical portions 60 and 61 are positioned such that when bolt 15 is rotated counterclockwise (i.e. to "undo" the latching mechanism" the two vertical portions 60 and 61 will come into contact with one another when arm 22 is aligned with slot 62 in base 8 that will permit drawing arm 22 through the slot, and hence through base 8, to allow the bolt to be fully retracted from the base and permit top 9 to rotate away from base 8 to effectively "open" the clamp.

Figure 19B:
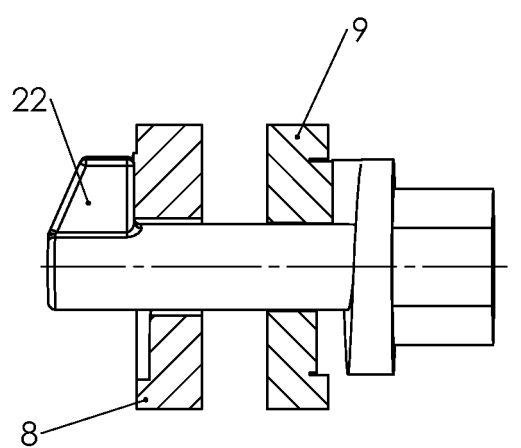
Figure 19A:
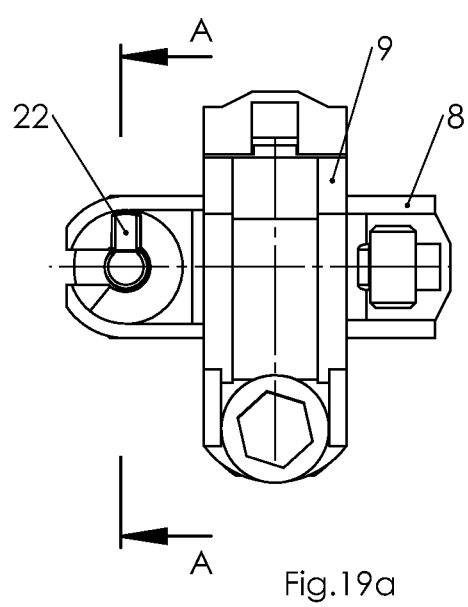
FIG. 19a is a view similar to FIG. 14a with the bolt rotated by approximately 270° and is in its locked position.
Figure 19C:
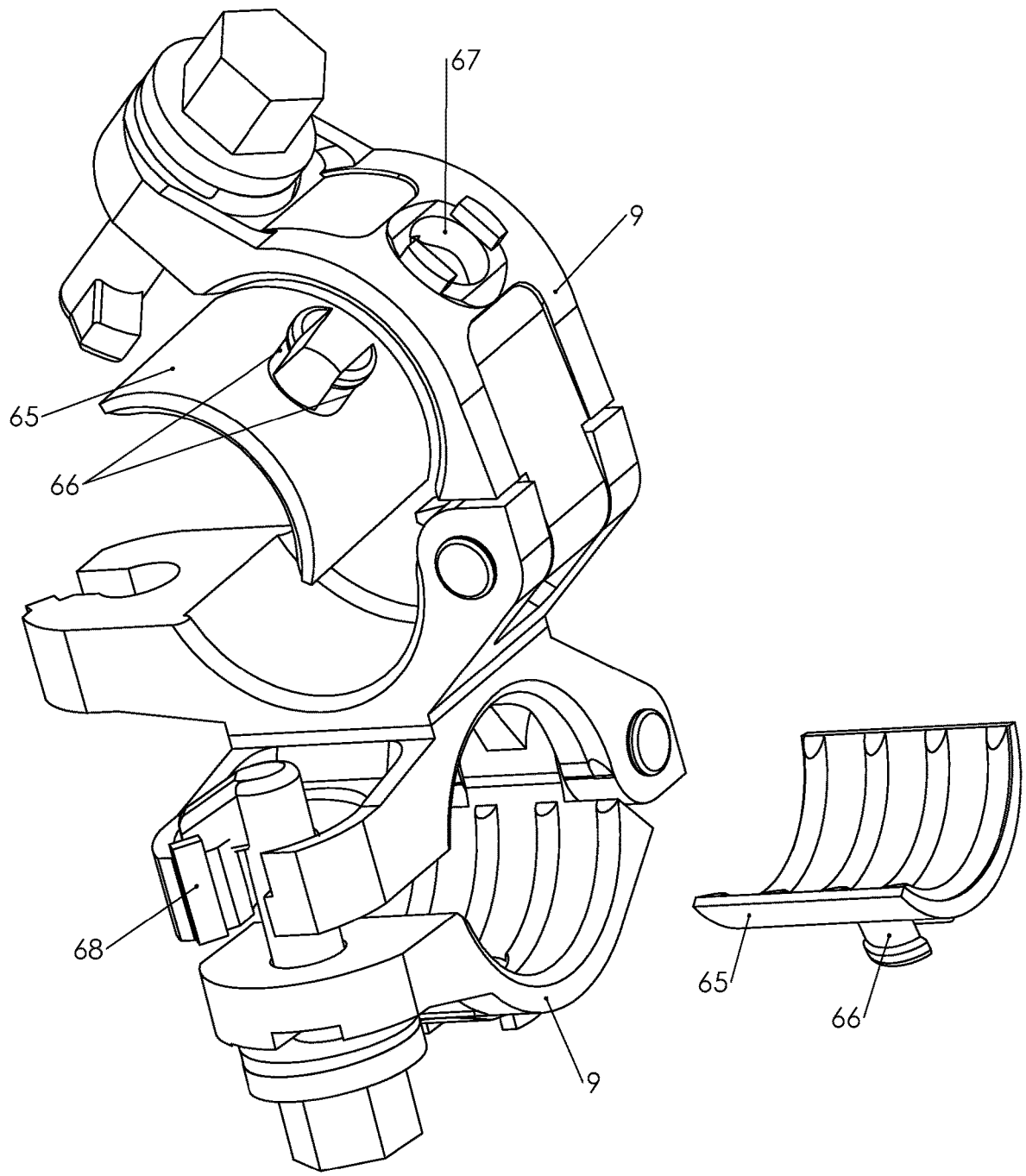
FIG. 19c is a view similar to FIG. 3 showing a slightly alternate embodiment wherein the scaffolding tube clamp includes an insert or adapter to accommodate scaffolding tubes of a smaller diameter, and wherein the ramp surface on the base portion includes a stop.
Figure 19D:
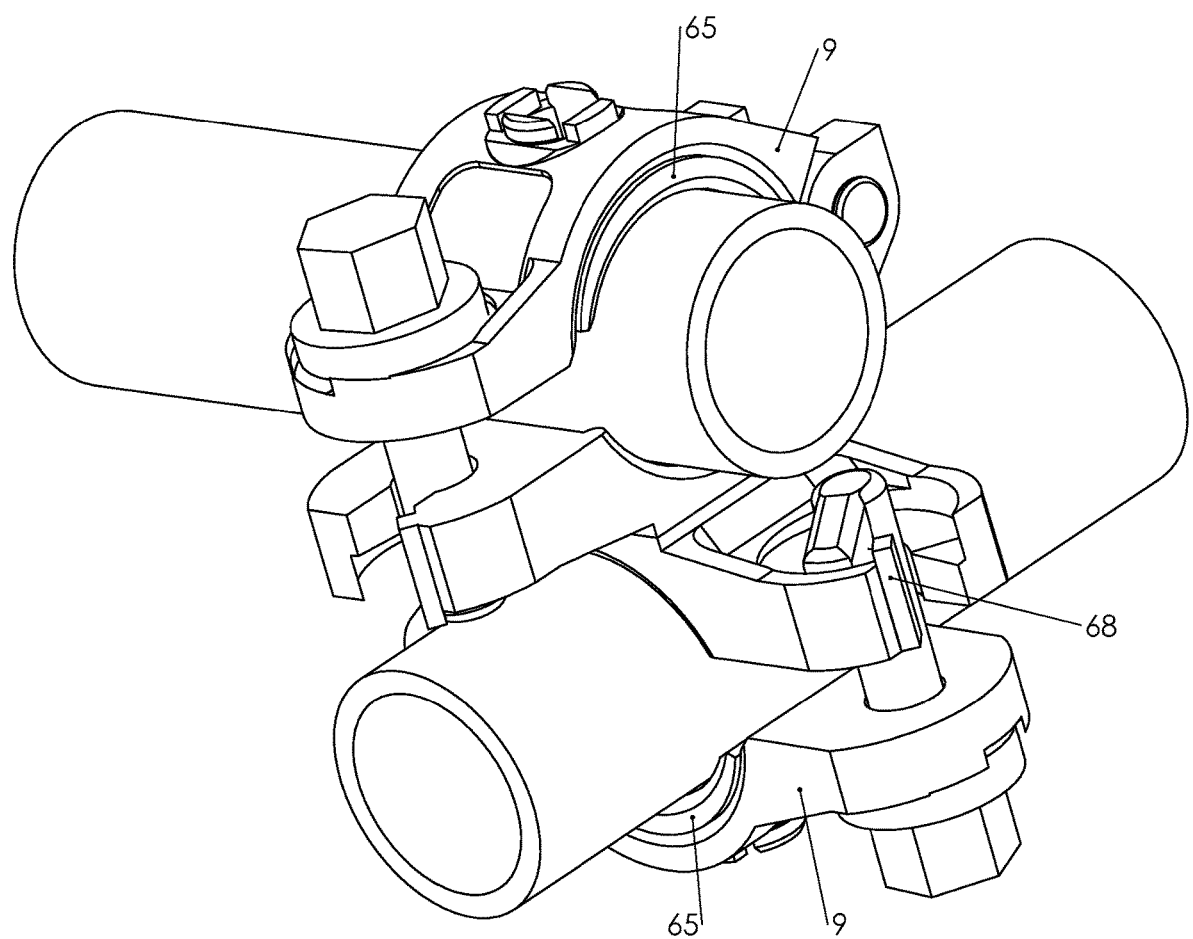
FIG. 19d is a figure similar to FIG. 19c showing the clamp received about the exterior surfaces of a pair of scaffolding tubes.
Figure 20:
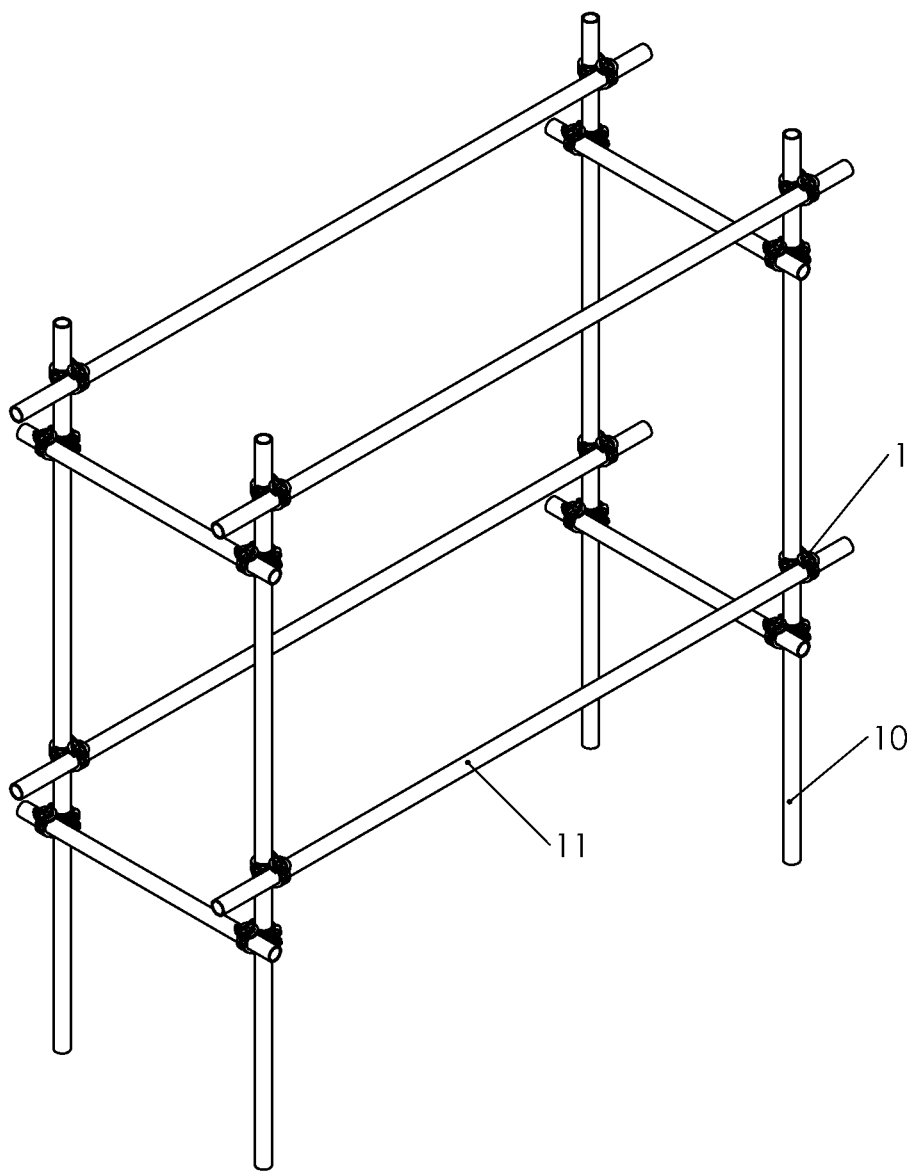
FIG. 20 is an upper side perspective view of a scaffolding utilizing scaffolding clamps in accordance with an alternate embodiment of the invention.
Figure 21:
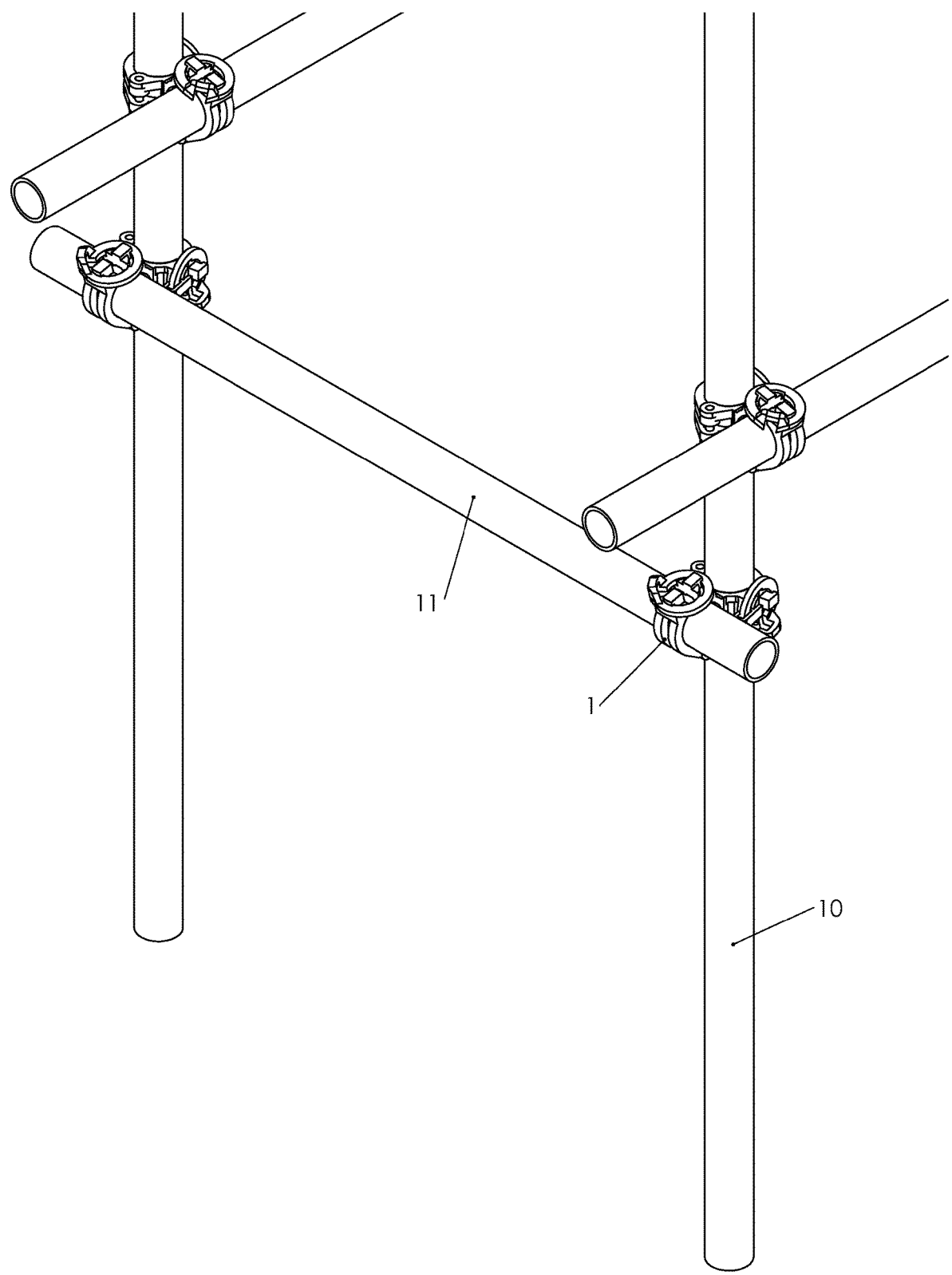
FIG. 21 is an enlarged detail view of the scaffolding tubes and scaffolding tube clamps of FIG. 20.
Figure 22:
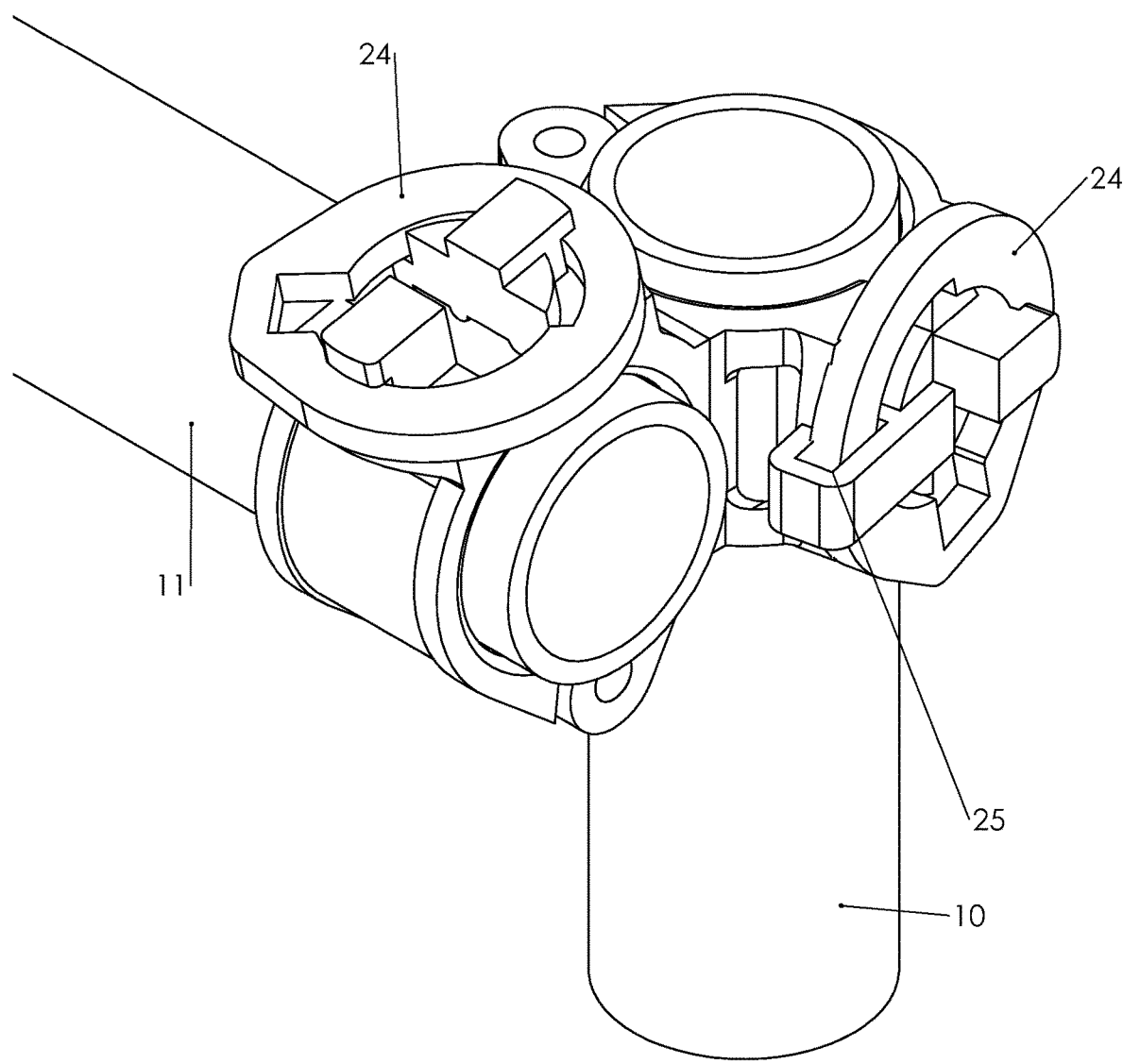
FIG. 22 is a further enlarged view of one of the scaffolding tube clamps shown in FIG. 21 in its locked position.
Figure 23:
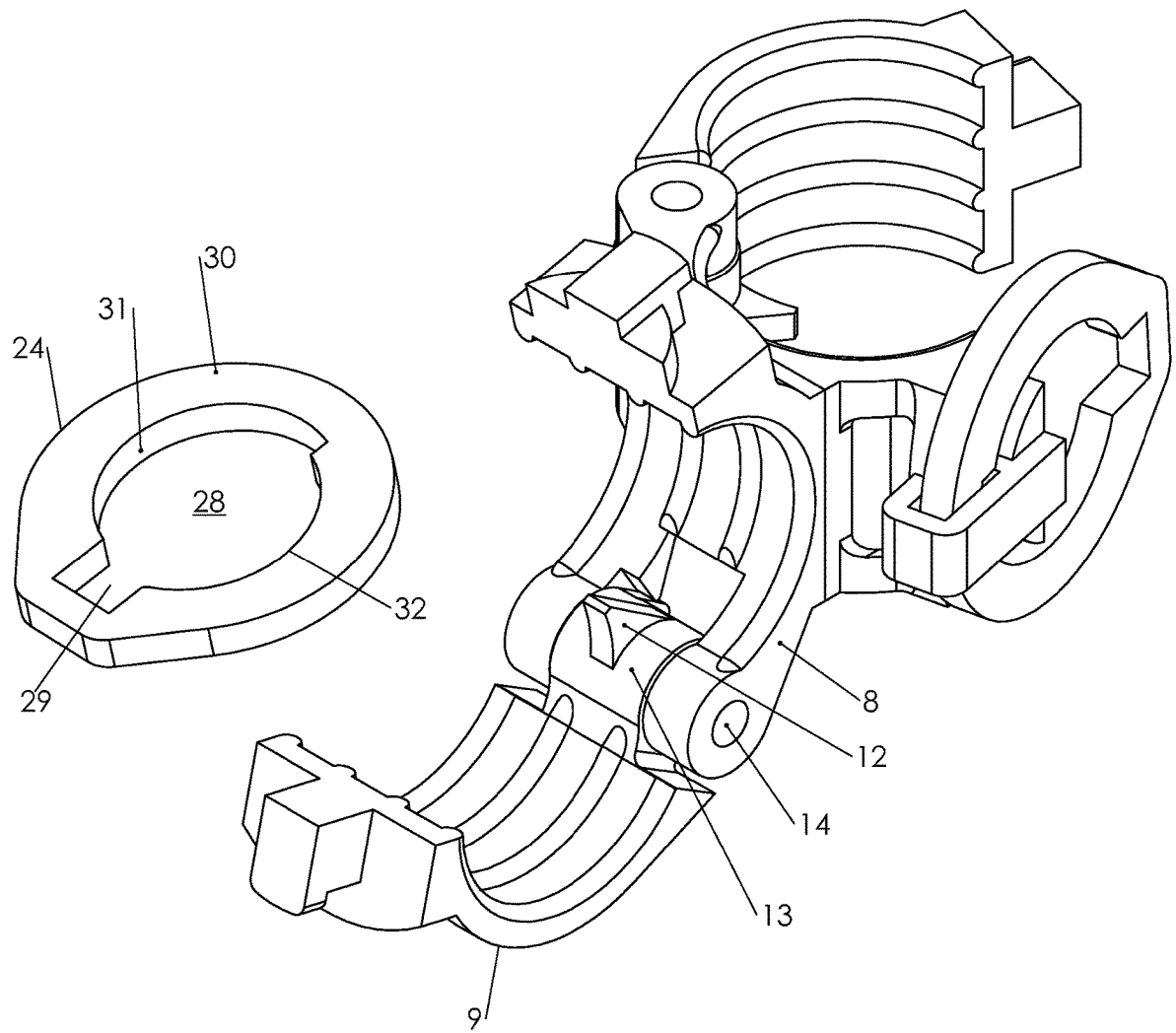
FIG. 23 is a view of the scaffolding tube clamp of FIG. 22 in an open and exploded configuration.
Figure 24:
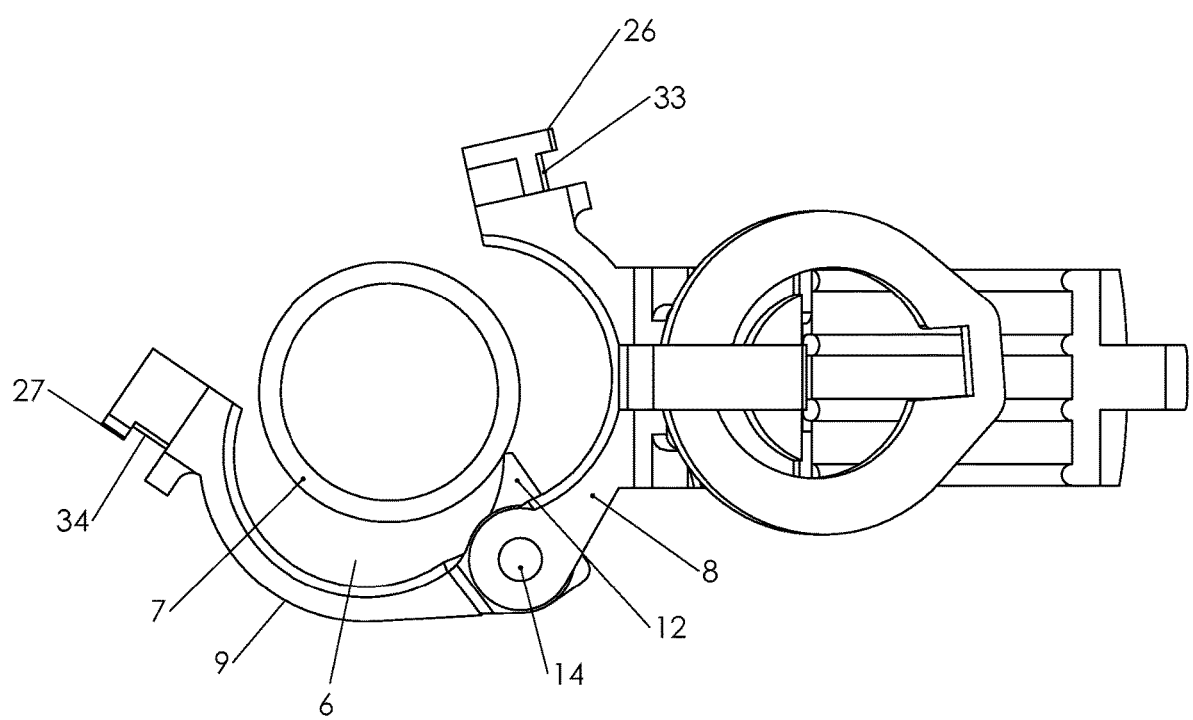
FIG. 24 is a side view of the scaffolding tube clamp of FIG. 23 immediately prior to being enclosed about a scaffolding tube.

With reference to FIGS. 19c and 19D, there is shown a slightly modified version of the scaffolding tube clamp that includes an insert or adapter 65 that is releasably securable to top portion 9 in order to accommodate scaffolding tubes or pipes of different diameters. That is, where desired or necessary insert 65 can be releasably secured to top 9 in order to allow the clamp to be secured about the exterior diameter of a scaffolding tube or pipe that is slightly smaller in diameter than in instances where insert 65 is not required.

It will be appreciated that insert 65 can be releasably secured to top 9 through any one of a wide variety of different manners or mechanical structures. In the particular embodiment shown in the attached drawings, a pair of spring tabs 66 extend through a hole 67 in top 9 such that they engage an outer surface of top 9 when received through hole 67. In that manner, insert 65 is retained within the curved body portion 4 that is formed by top 9, while being easily removed to accommodate tubes or pipes of a larger diameter.

FIGS. 19c and 19D also show a slight alteration to the ramped surface 16 wherein the surface includes a stop 68 against which arm 22 will be received when bolt 15 is rotated fully toward its engaged position. Stop 68 will prevent an over tightening of the bolt which could in some instances result in a crushing or otherwise damaging force being applied to the exterior surface of the scaffolding tube or piping.

Referring to the embodiment of the invention shown in FIGS. 20 through 32c, it will be appreciated that much of the scaffolding clamp shown in this embodiment is the same or essentially the same as that of the embodiment shown in FIGS. 1 through 19b. The primary difference between the two embodiments is the manner in which top 9 is secured or fastened to base 8. In this embodiment, rather than through use of a bolt 15, the two components are secured together by way of a rotating ring 24. Rotating ring 24 may be completely removable from clamp 1 or, alternatively, it may be received within a slot 25 such that it can be rotated relative to the clamp, but remain fixed in place on base 8. In the embodiment depicted in the attached drawings, the portion of clamp 1 that is secured about vertical tube 10 includes a slot 25 to retain rotating ring in place on base 8, whereas the portion of clamp 1 that secures horizontal tube 14 employs a fully removable rotating ring 24. In either case, through a thorough understanding of the invention it will be appreciated that in each instance rotation of ring 24 has the effect of drawing together the outer ends of tops 9 and basis 8 to affectively apply a compressive force about the exterior surface of the scaffolding tubing and securely hold the tubing in place.

Figure 25:
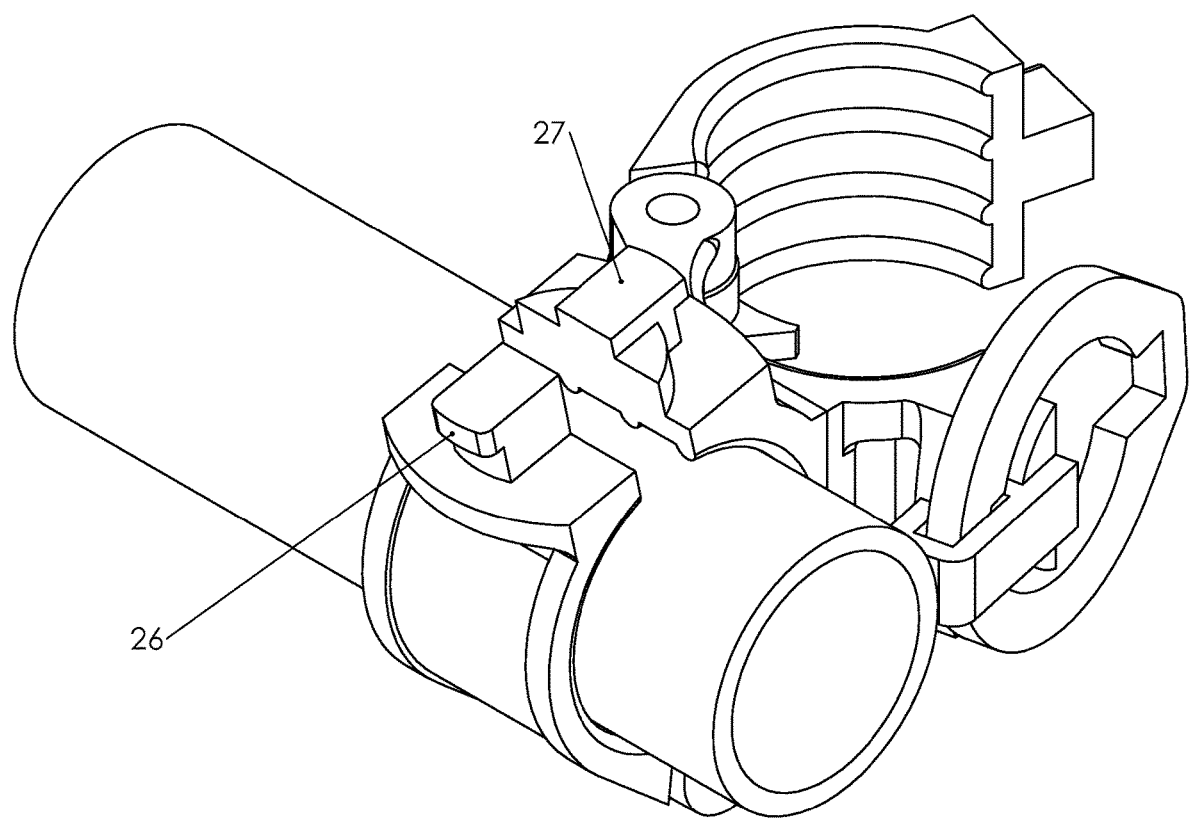
FIG. 25 is an upper side perspective view subsequent of FIG. 24 wherein the clamp has been enclosed about the exterior surface of the scaffolding tube.
Figure 26:
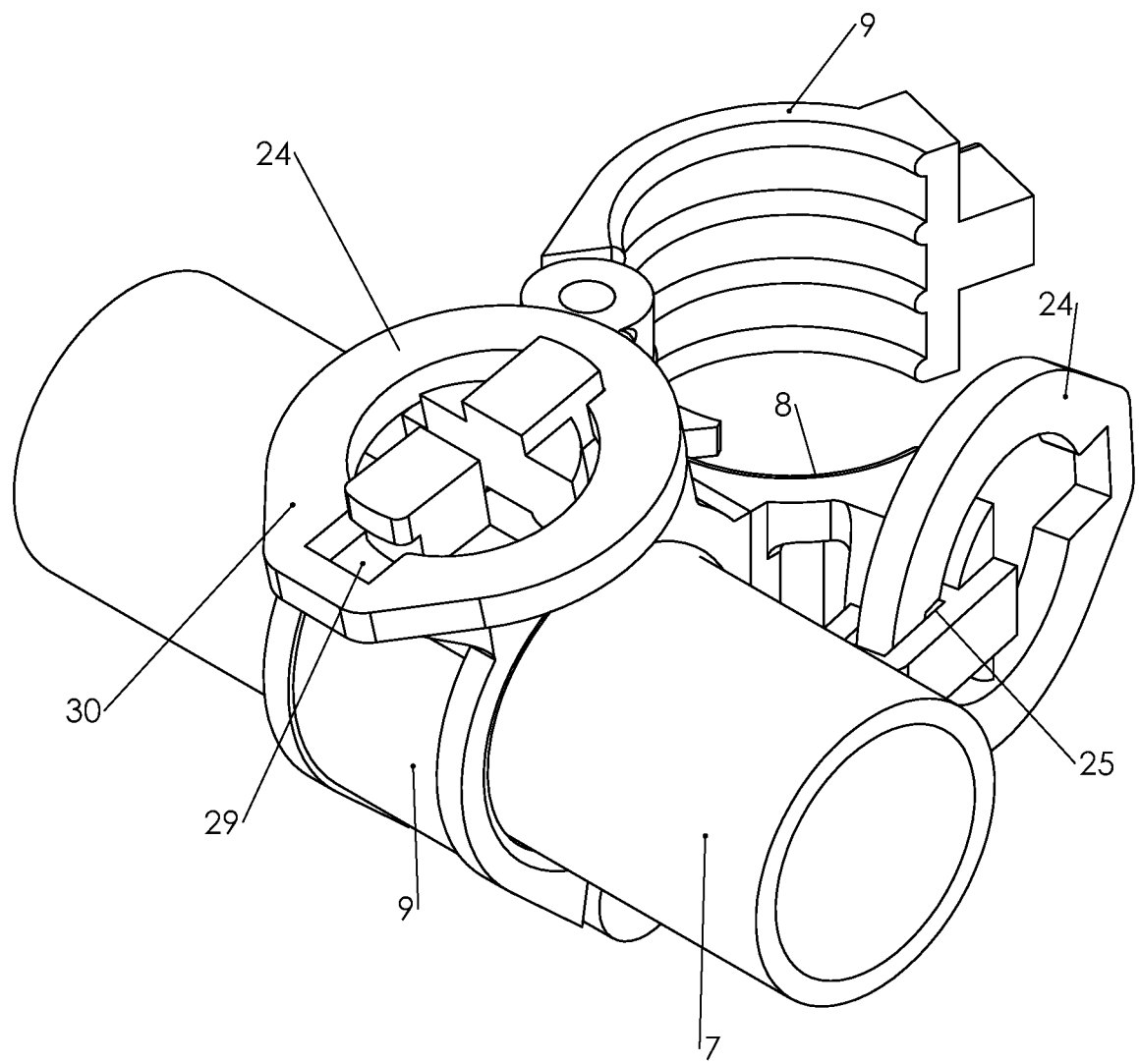
FIG. 26 is a view subsequent to FIG. 25 wherein the locking ring has been applied to the scaffolding tube clamp, but has not yet been rotated into its locked position.
Figure 27:
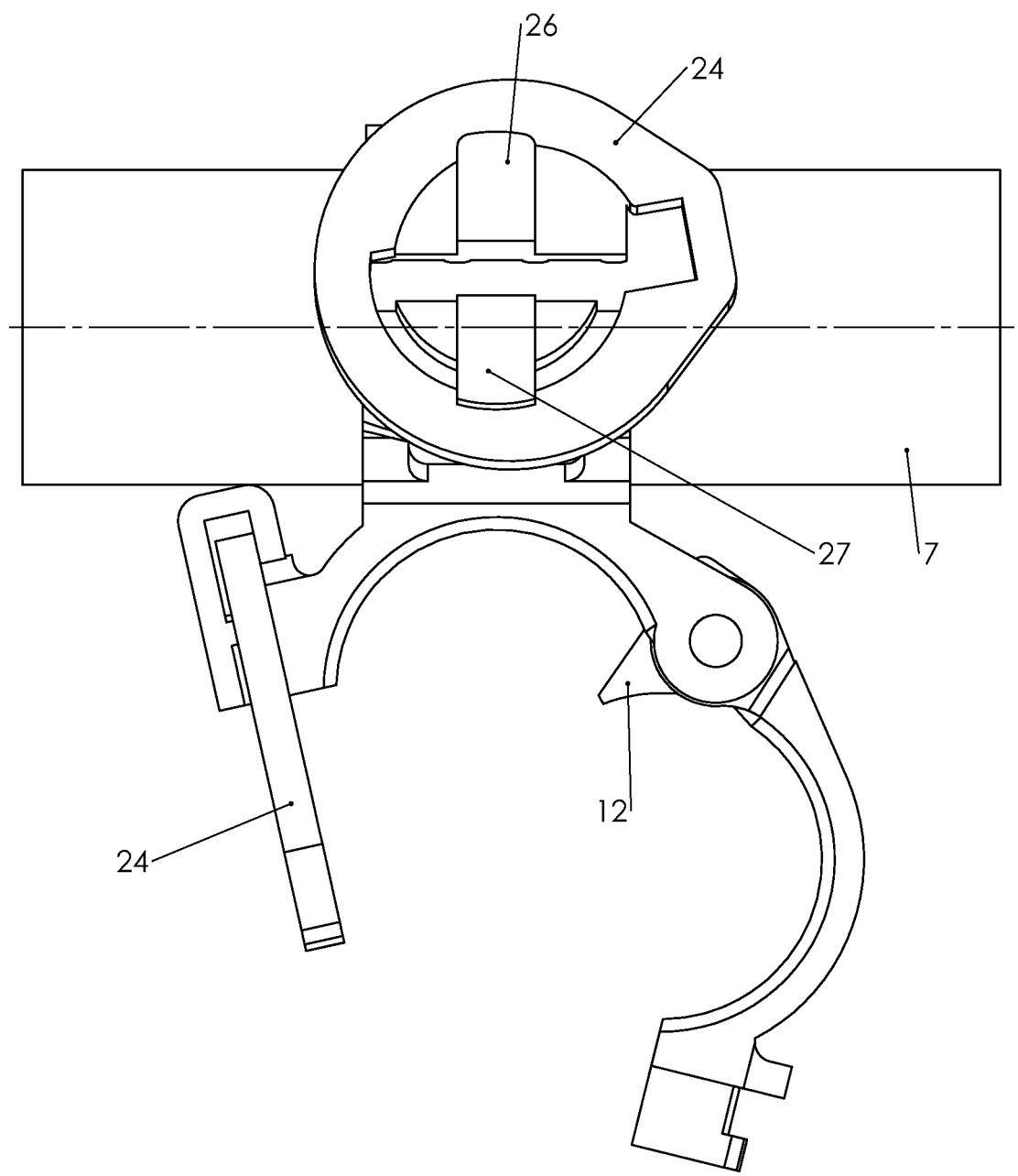
FIG. 27 is a plan view subsequent to FIG. 26 wherein the locking ring has been rotated by approximately 60°.
Figure 29B:
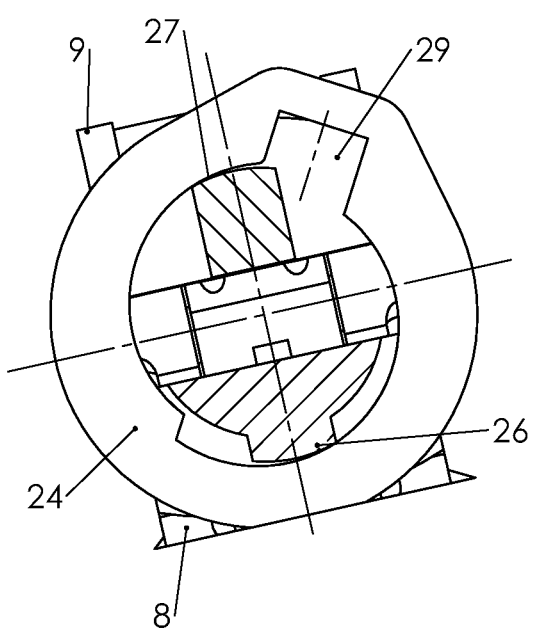
Figure 29A:
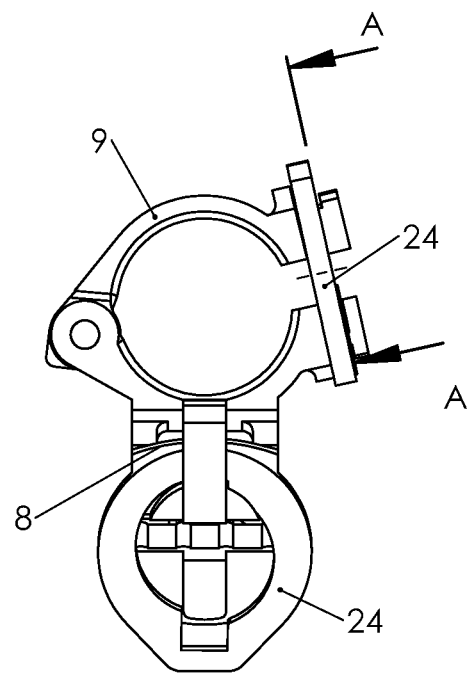
FIG. 29a is a view similar to FIG. 28a wherein the removable ring has been rotated by approximately 30°.
Figure 33:
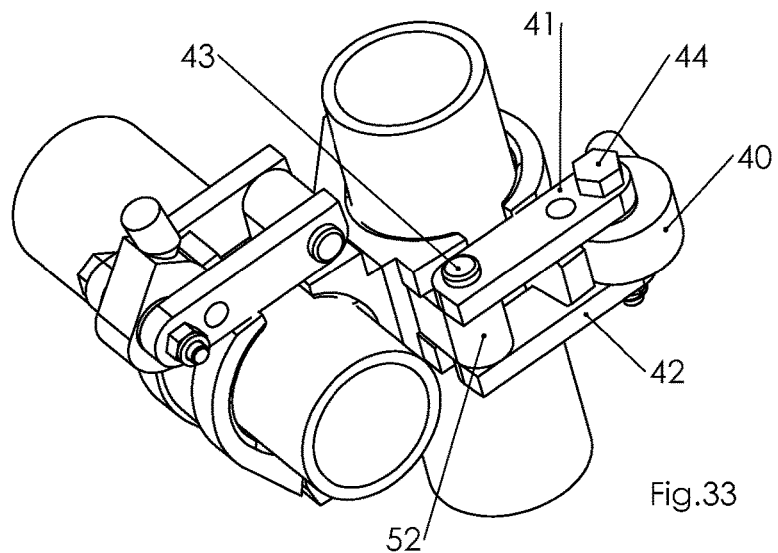
FIG. 33 is an upper side perspective view of an alternate embodiment of the scaffolding tube clamp.
Figure 34:
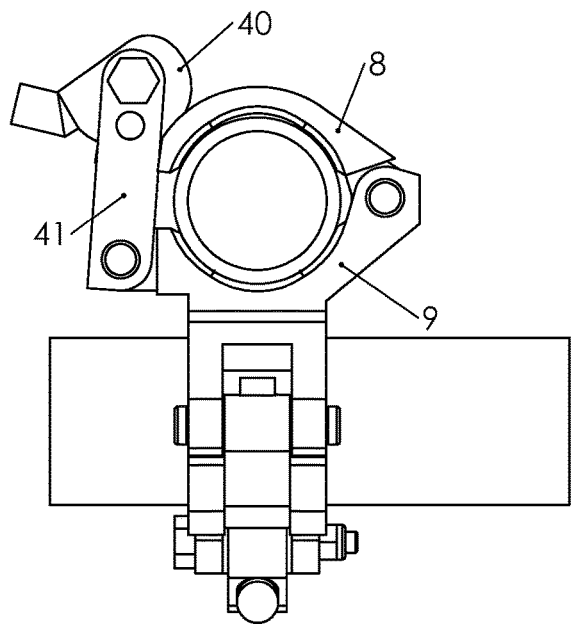
FIG. 34 is a left side view of the scaffolding tube of FIG. 33.
Figure 35:
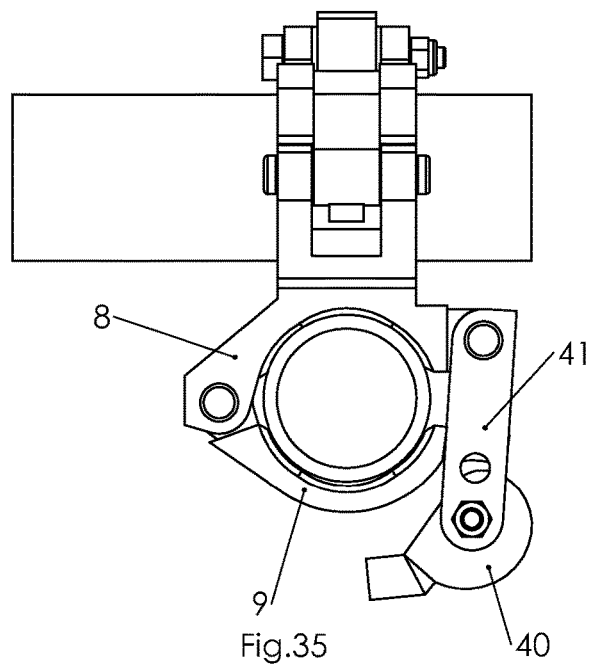
FIG. 35 is a rotated right side view of the scaffolding tube of FIG. 33.
Figure 38:
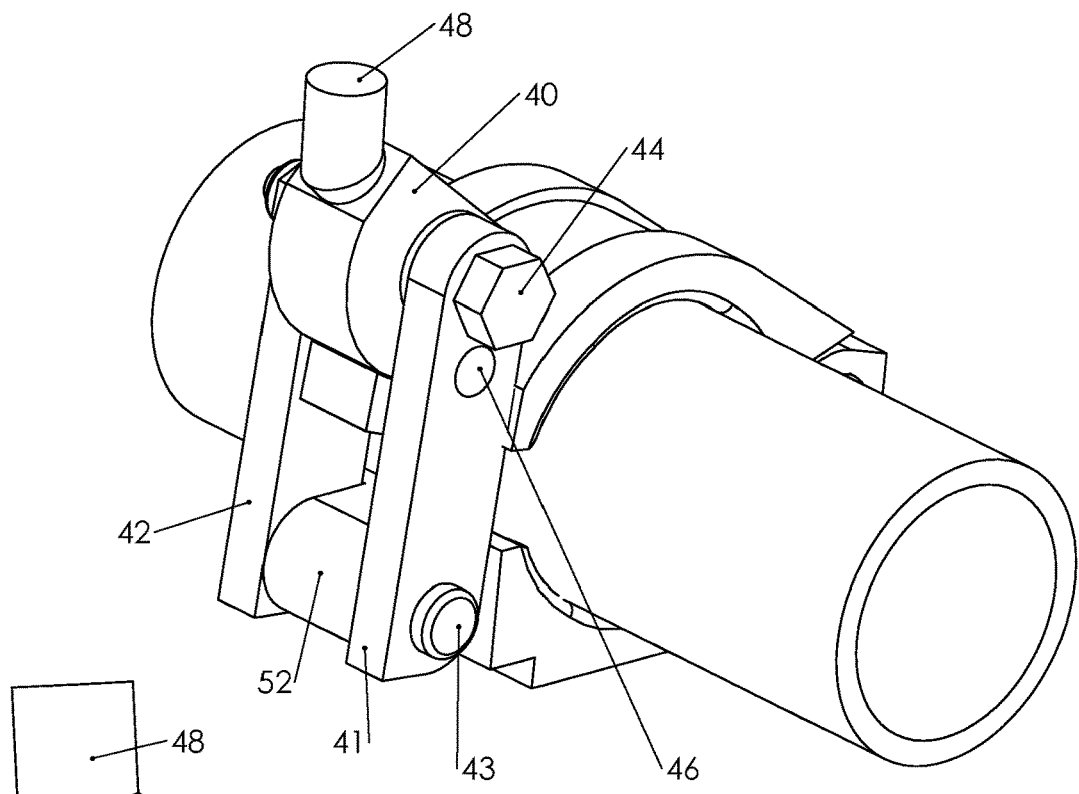
FIG. 38 is an upper side perspective view of one of the clamping members of the scaffolding tube clamp of FIG. 37.

In conjunction with rotating ring 24, the outer ends of each of base 8 and top 9 include lip portions 26 and 27, respectively. Lip portions 26 and 27 are directed away from one another, for example as shown in FIG. 25.

Rotating ring 24 includes an internal opening 28 that has a slot 29. Slot 29 is configured to be received about one of lip portions 26 and 27 to enable ring 24 to be received over the two respective outer ends of base 8 and top 9 with lip portions 25 and 27 extending upwardly beyond the upper surface 30 of ring 24, as, for example, shown in FIG. 26.

FIGS. 28 through 32 show the function of ring 24 and how through rotating the ring the ends of base 8 and top 9 can be drawn together in order to compress clamp 1 about the exterior surface of tube 7 (not shown in these particular Figures). Opening 28 in ring 24 is largely comprised of two arcuate or cammed portions, 31 and 32, respectively. In the particular embodiment shown in the attached drawings, as ring 24 is rotated in a clockwise direction, cammed portion 31 engages undercut portion 33 of lip 26 on base 8. At the same time, cammed portion 32 engages undercut portion 34 of lip 27 on top 9. The arcuate nature of the cammed portions and their respective engagement of the undercut portions of lips 26 and 27 serve to draw the outer ends of base 8 and top 9 closer together and to thereby compress the respective components of the clamp 1 about the exterior surface of tube 7. FIGS. 28 through 32 show ring 24 in a progressive extent of rotation from 0° in FIG. 28 to approximately 135° in FIG. 32. When rotated to the extent shown in FIG. 32, ring 24 will be "locked" and tightly held in place, with tube 7 secured within opening 6 between base 8 and top 9. "Unlocking" clamp 1 requires the rotation of ring 24 in a counterclockwise direction to release the force created by the interaction of the caromed portions 31 and 32 with undercut portions 33 and 34.

With reference to FIGS. 33 through 46 there is shown a further embodiment of the invention. Once again, much of the scaffolding clamp shown in this embodiment is the same or similar to that of the embodiments shown in FIGS. 1 through 32. The primary difference between the embodiments is the manner in which top 9 is secured or fastened to base 8. In the particular embodiment of FIGS. 33 through 46, rather than through the use of a bolt or a rotating ring, the two components are secured together by way of the operation of a rotating eccentric wheel or cam 40. Here, base 8 includes a pair of arms 41 and 42 that are rotatably secured to the base by a pin or bolt 43. A sleeve 52 can be used to maintain the arms 41 and 42 spaced apart by a pre-determined distance The distal ends of arms 41 and 42 (opposite to the ends which receive pin or bolt 43) contain at least one pair of holes 46 through which a pin or bolt 44 is received in order to rotatably secure eccentric wheel or cam 40 to the ends of the pair of arms. As will be described in further detail below, when top 9 and base 8 are received about scaffolding tubing 7, arms 41 and 42 can be rotated to permit eccentric wheel or cam 40 to engage a flange 45 extending outwardly from the distal end of top 9.

Figure 39:
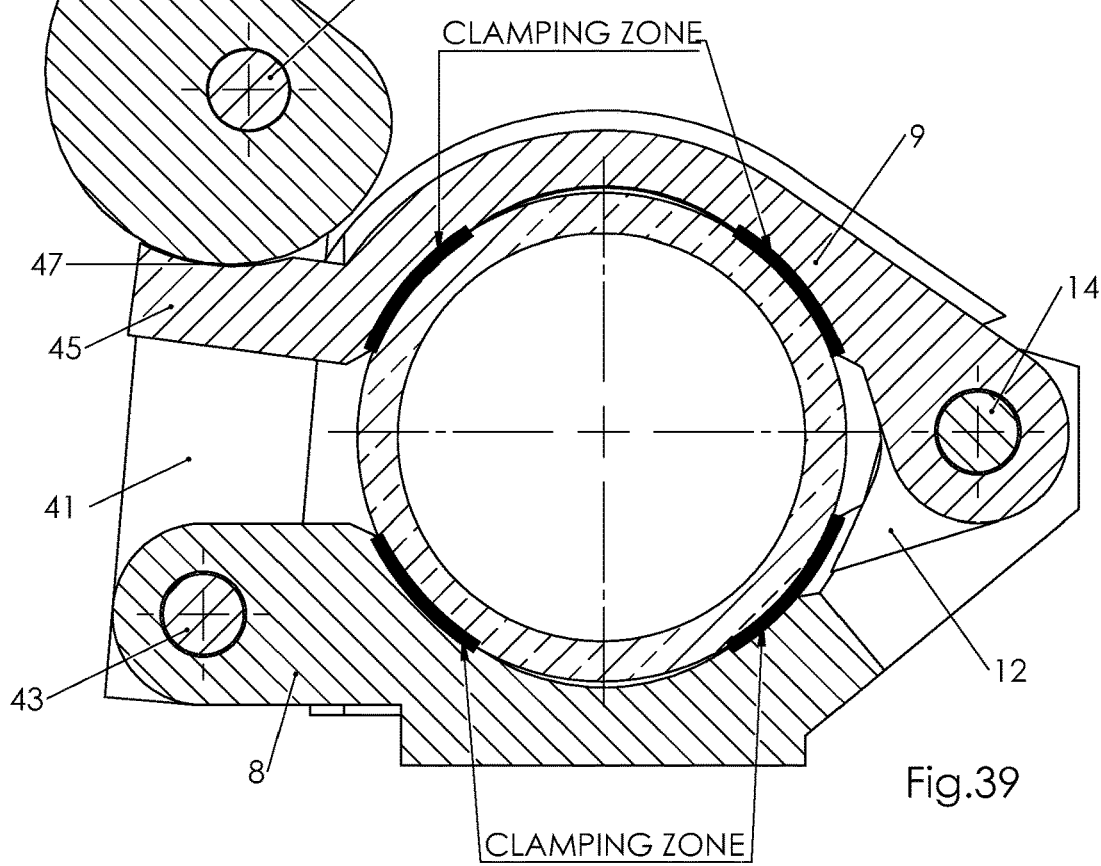
FIG. 39 is an enlarged detail view of FIG. 37.
Figure 40:
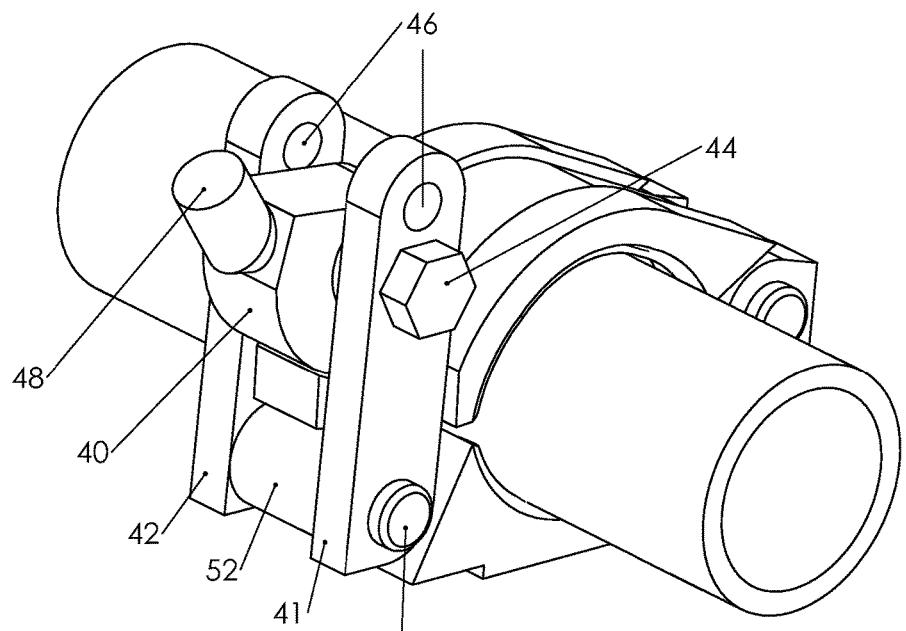
FIG. 40 is an upper side perspective view of one of the clamping members of the scaffolding tube clamp of FIG. 38, modified for use on a smaller diameter scaffolding tube.
Figure 41:
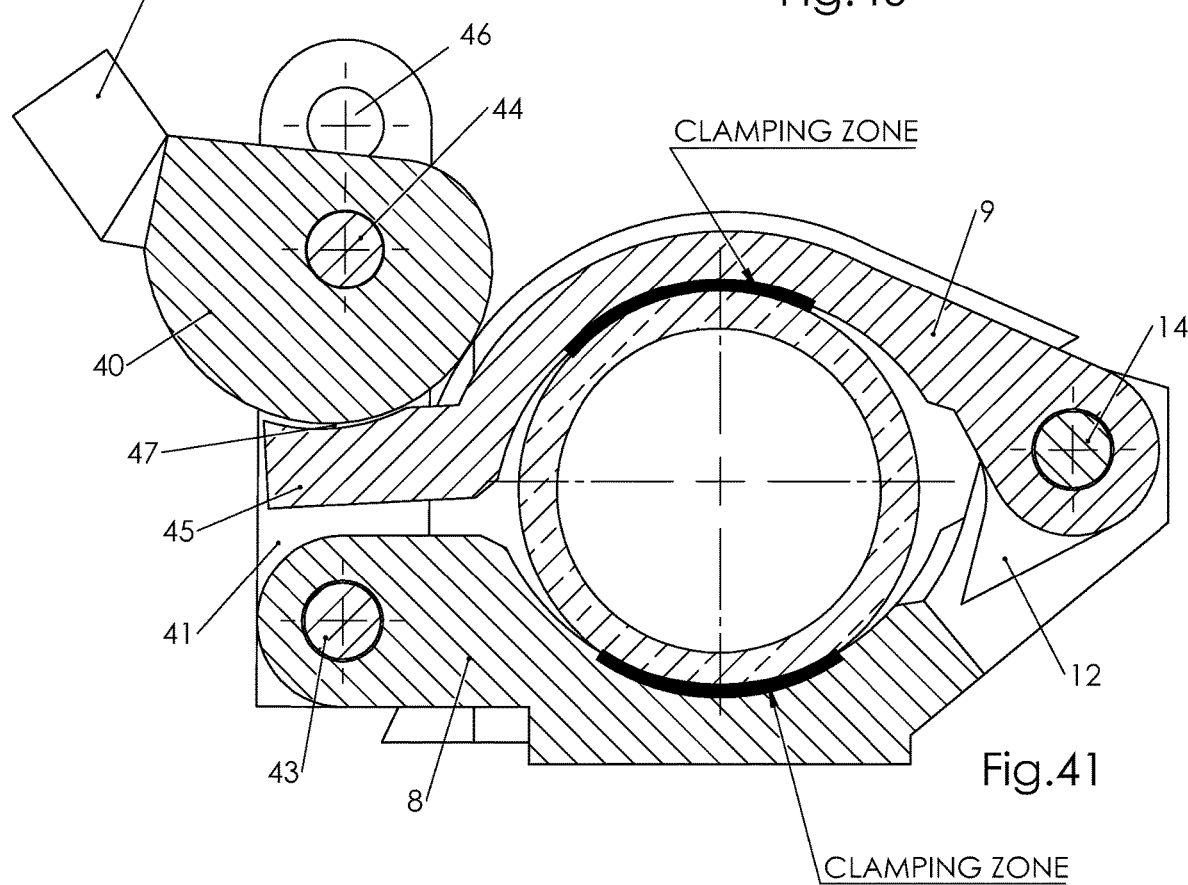
FIG. 41 is a side sectional view of the scaffolding tube clamp shown in FIG. 40.
Figure 42:
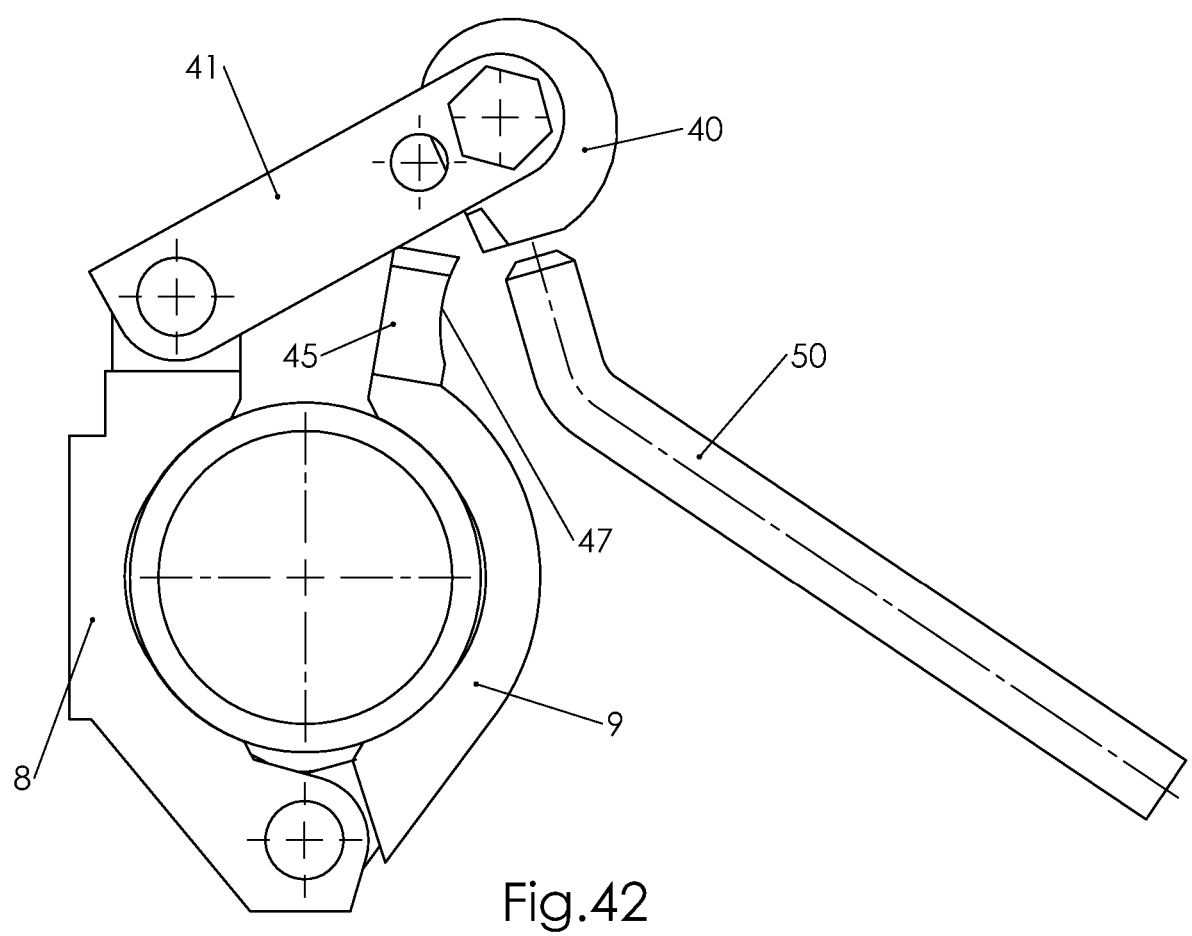
FIG. 42 is an alternate embodiment of the scaffolding tube clamp of FIG. 37 showing use of a tool to activate the locking mechanism.
Figure 43:
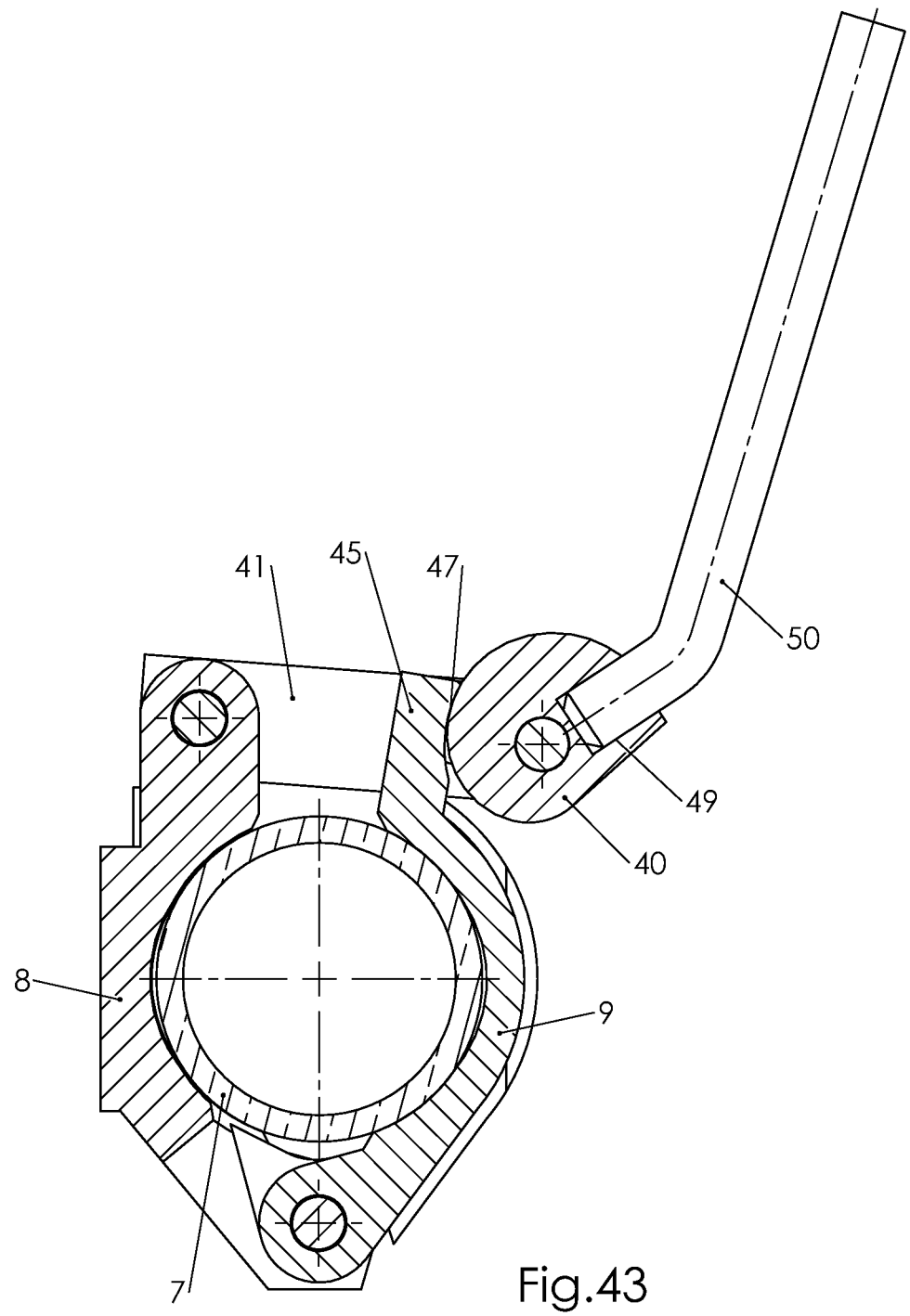
FIG. 43 is a side sectional view of the scaffolding tube clamp of FIG. 42 wherein the eccentric wheel or cam has been rotated by the tool.
Figure 44:
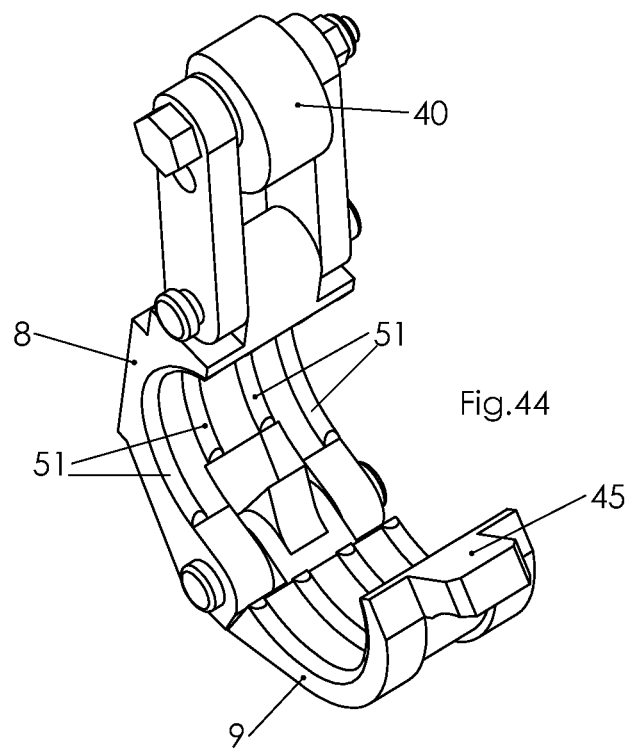
Figure 45:
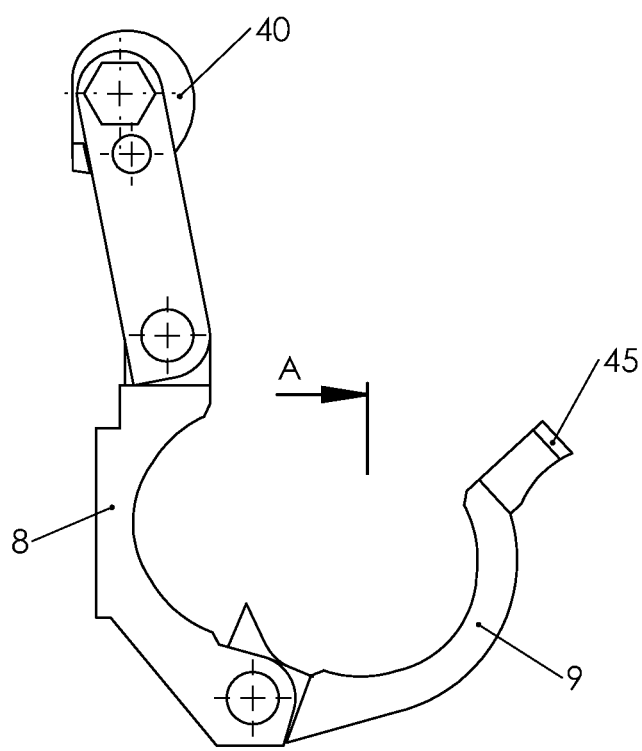
FIG. 45 is a side view of the clamping member shown in FIG. 44.
Figure 46:
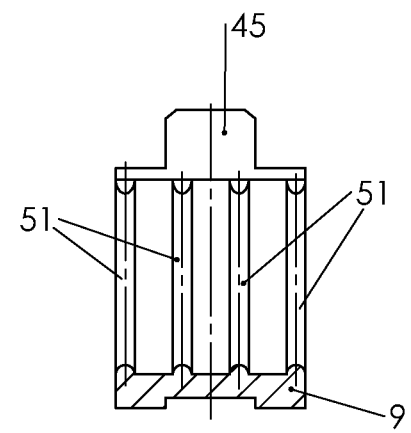
FIG. 46 is a sectional view taken along the line A-A of FIG. 45.

With reference to FIGS. 38 through 41, in an embodiment of the invention the distal ends of arms 41 and 42 may include two pairs of holes 46 that allow pin or bolt 44 to be inserted through arms 41 and 42 at two different distances from pin 43. Through engaging different pairs of holes 46, the clamp can be easily and quickly modified to accommodate scaffolding tubes of different diameters. The lower set of holes is designed to accommodate a scaffolding tube of a smaller diameter (for example 43 millimeters) as opposed to the outer set of holes which can be utilized to accommodate a tube of a slightly larger diameter (for example 48 millimeters). To accommodate scaffolding tubes of different diameters, the interior curved surfaces of rotating tops 9 and bases 8 have a radius that is sized to be slightly larger than that of the smallest diameter tube for which the clamp is designed and also slightly smaller than that of the largest diameter tube for which the clamp is designed. In so doing, when bolt 44 is in the lowermost pair of holes 46 of arms 41 and 42, and the scaffolding tube clamp received about a 43 mm tube (in the particular example shown), activation of eccentric wheel or cam 40 will cause contact between top 9 and tube 7 and between base 8 and tube 7 at a single contact zone along the surface of each of rotatable top 9 and base 8, positioned generally at the central area of the curved body portions (see FIG. 41). In contrast, where bolt 44 is in the outermost pair of holes 46 in arms 41 and 42, and the scaffolding tube clamp received about a 48 mm tube (in the particular example shown), activation of eccentric wheel or cam 40 results in two contact zones between rotatable top 9 and tube 7 and two contact zones between base 8 and tube 7 (see. FIG. 39).

With reference to the attached drawings, it will be appreciated that with top 9 and base 3 received about the exterior surface of a scaffolding tube 7, arms 41 and 42 can be rotated to a position wherein they are approximately perpendicular to base 8 such that eccentric wheel or cam 40 is positioned above and adjacent to flange 45. The upper surface 47 of flange 45 may be slightly radiused to accommodate the curved eccentric surface of wheel or cam 40. When so positioned, rotation of eccentric wheel or cam 40 will cause its exterior surface to engage radiused surface 47, effectively driving flange 45 toward bolt 43 and causing rotatable top 9 and base 8 to be drawn into contact with the exterior surface of tube 7. As eccentric wheel or cam 40 is further rotated its caromed or eccentric outer surface will enhance the clamping force applied to the exterior surface of tube 7, to thereby securely hold the scaffold tube clamp in place.

To aid in the rotation of eccentric wheel or cam 40, the wheel or cam may include a post 48 that can be hit with a hammer or other tool causing the wheel or cam to rotate and become locked in position. In an alternate embodiment (see FIGS. 42 and 43) eccentric wheel or cam 40 may include a bore 49 into which a tool or handle 50 can be inserted in order to apply leverage and to rotate the wheel or cam into its locked or unlocked configuration. In this embodiment, removal of tool 50 when eccentric wheel or cam 40 is in its locked configuration prevents unauthorized individuals from easily or readily unlocking the scaffolding tube clamp without access to an authorized tool. To that end, the interior configuration of bore 49 and the exterior surface of tool 50 could be of a geometric shape (for example, star, non-uniform hexagon, etc) that prevents objects other than tool 50 from being inserted into bore 49, to further limit unauthorized rotation of eccentric wheel or cam 40.

The interior surfaces of top 9 and base 8 that contact scaffolding tube 7 may include a series of ribs or ridges 51 that help to concentrate the clamping load along specific lines and to thereby help to prevent slippage or sliding of the clamp along the surface of the tube.

It will be appreciated that the scaffolding tube clamp of the embodiment shown in FIGS. 33 through 46 presents the ability to apply a significant clamping force against the exterior surface of a scaffolding tube through rotation of eccentric wheel or cam 40. The utilization of a pair of arms 41 and 42, having multiple holes 46 in their ends, permits an adjustment of the clamp to allow it to engage scaffolding tubes of different diameters. The operation of eccentric wheel or cam 40 applies a force against flange 45 that draws rotatable top 9 toward base 8 to securely hold a scaffolding tube there between. Through applying the force against flange 45, additional torque can effectively be applied to rotatable top 9 on account of the moment arm created by the flange. Engagement and disengagement of the eccentric wheel or cam lock is accomplished both quickly and easily. For added safety a dedicated tool can be required to prevent authorized loosening or disengagement of the eccentric wheel or cam lock.

Referring to FIGS. 47 through 53, there is shown an embodiment of the scaffolding tube clamp wherein bolt 15 incorporates a threaded portion. In this embodiment the overall structure of the scaffolding tube clamp is generally similar to that shown in FIGS. 1 through 19D. The primary difference in the embodiment of FIGS. 47 through 53 is that bolt 15 contains a threaded portion 70. As shown in the attached drawings, in this embodiment bolt 15 once again has a ramped surface 20 that engages a ramped surface 17 on top 9 as the bolt is rotated, in order to drive the outer end of top 9 toward outer end of base 8 and to compress the two portions of the clamp member together about the exterior surface of the scaffolding tube or pipe. That is, the interaction between bolt 15 and top 9 (and more particularly ramped surfaces 17 and 20) is essentially the same as in the embodiment shown in FIGS. 1 through 19D.

In FIGS. 47 through 50 threaded portion 70 mates with a hole 71 in base 8 where hole 71 has a thread corresponding to that of threaded portion 70. Threaded portion 70 is of a constant pitch along its length. In this instance the pitch of threaded portion 70 is relatively coarse such that one full rotation of the bolt causes top 9 to be drawn toward base 8 to a significant degree, taking into account the particular application and circumstances at hand. In one embodiment, one full rotation of bolt 15 moves top 9 closer to base 8 by approximately 8 mm. It will be appreciated that other pitches and rates of advance of the bolt with one revolution can be used.

Figure 47:
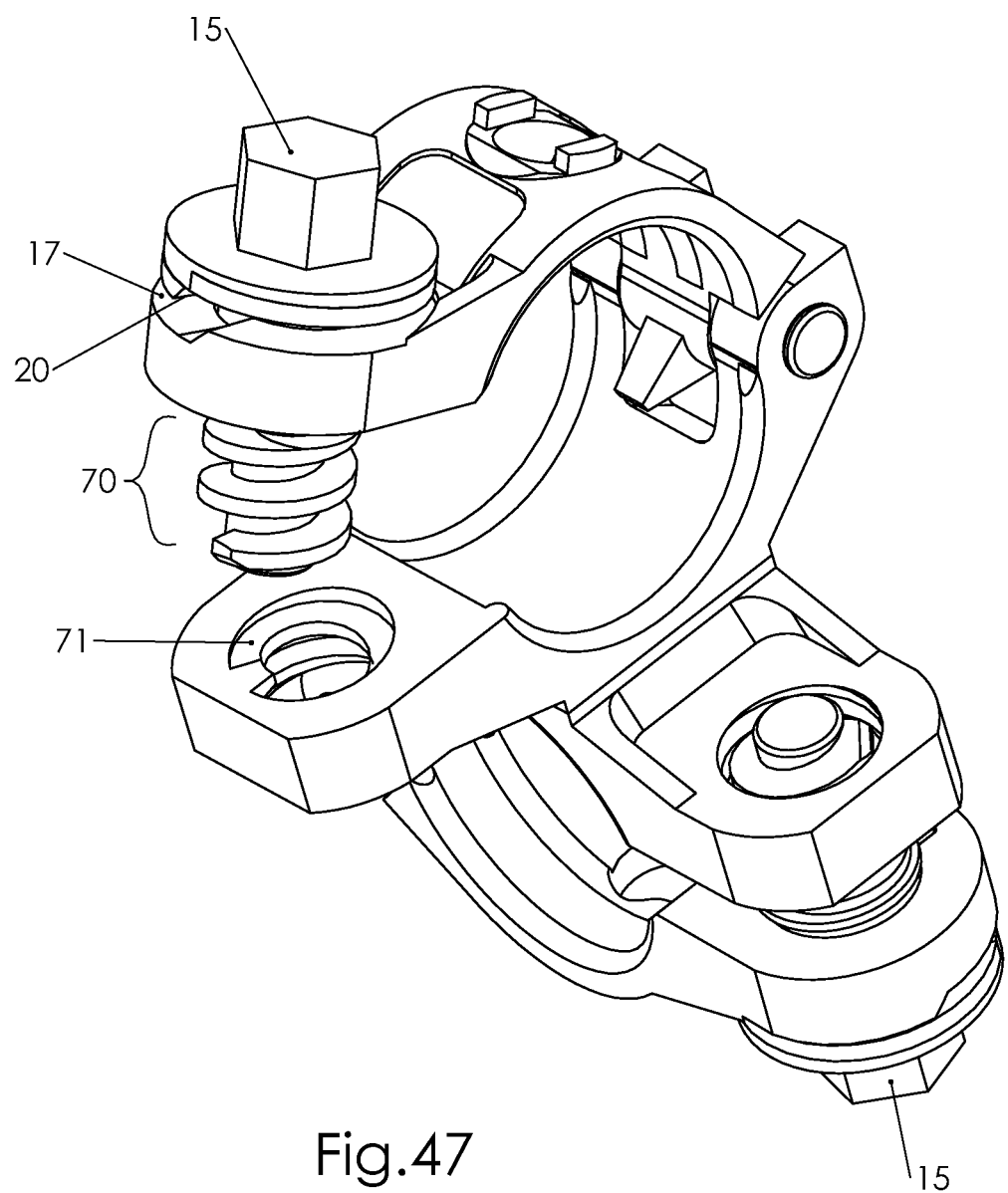
FIG. 47 is an upper side perspective view of a scaffolding tube clamp in accordance with an alternate embodiment of the invention wherein the clamping bolt incorporates both a ramped surface and a threaded portion.
Figure 48:
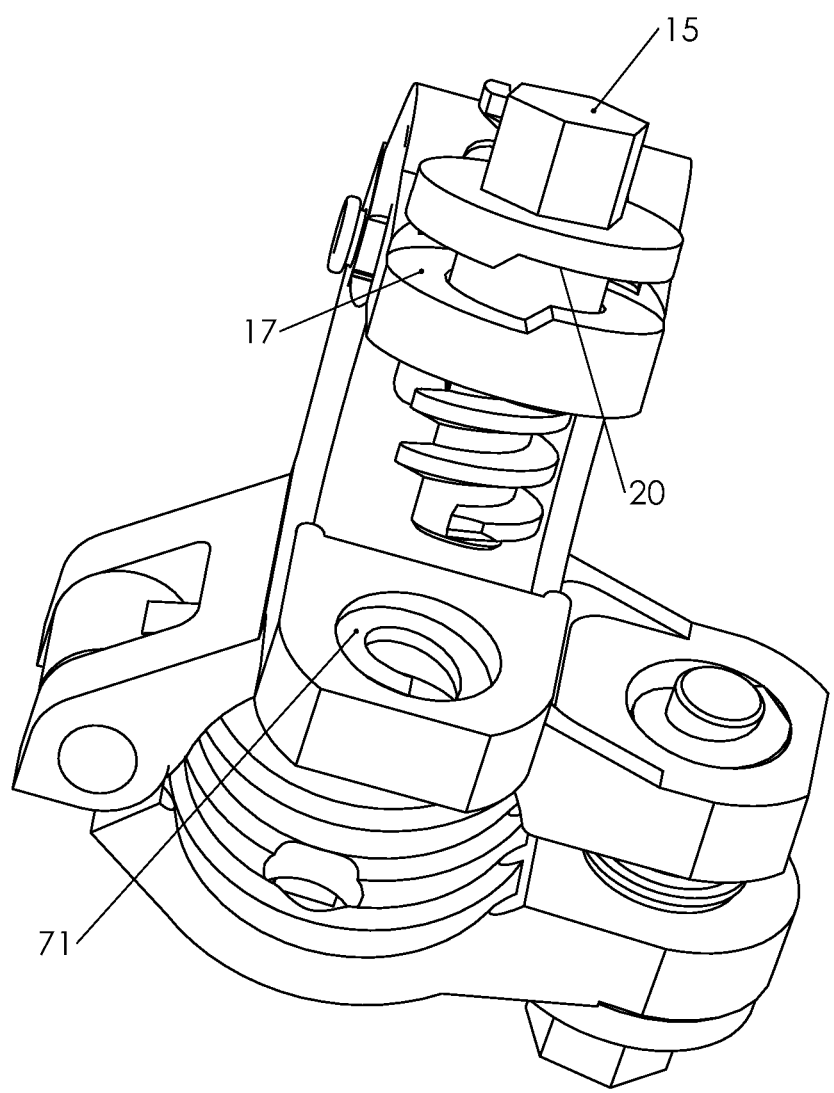
FIG. 48 is a front view of the scaffolding tube clamp of FIG. 47 wherein the bolt has been partially retracted
Figure 49:
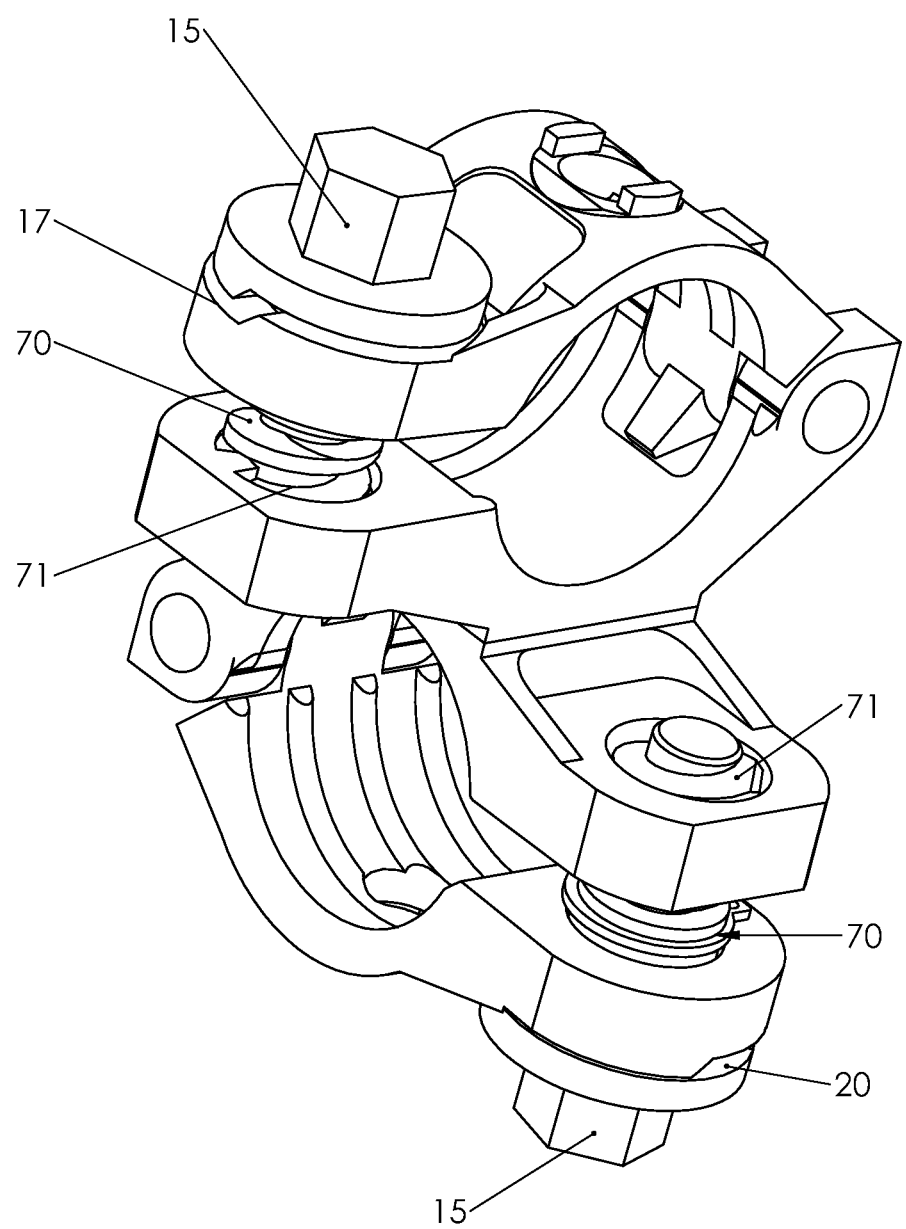
FIG. 49 is a view similar to FIG. 47 wherein the bolts have been engaged and the tops of the clamp are releasably secured to their bases.
Figure 50:
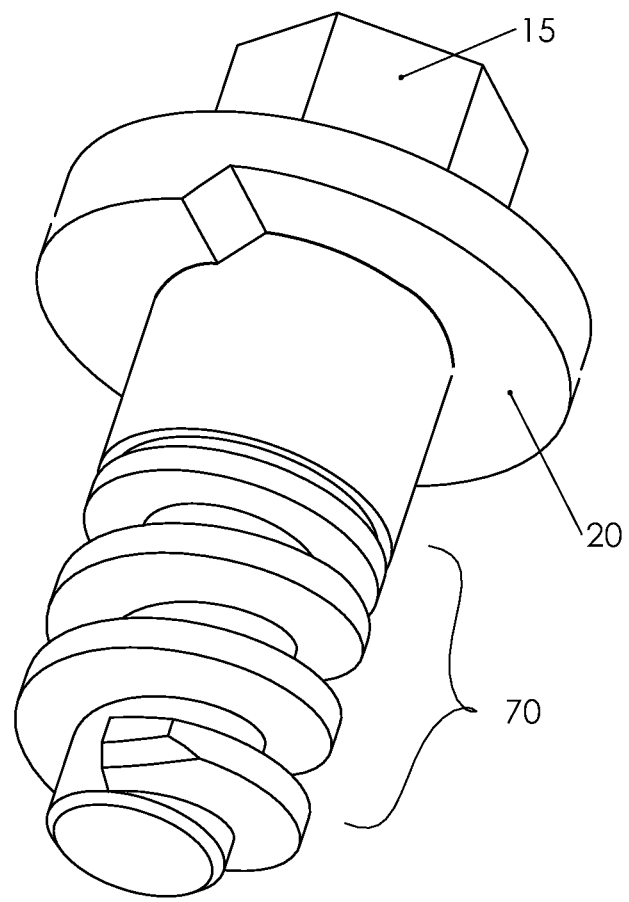
FIG. 50 is a lower perspective view of the bolt of the scaffolding tube clamp of FIG. 47.

In use, the scaffolding tube clamp of FIGS. 47 through 49 is first "opened" to permit a scaffolding tube to be received within the clamping members. Top 9 is then rotated and received about the exterior surface of the scaffolding tube, after which threaded portion 70 of bolt 15 can be received within hole 71 for threaded engagement therewith. At that point, rotation of bolt 15 will cause the course threads of portion 70 and hole 71 to draw top 9 toward base 8 in a relatively fast manner to enable the clamp to be quickly secured about the surface of the scaffolding tube with only minimal rotation of bolt 15. When top 9 is moved sufficiently close to base 8 such that ramped surfaces 17 and 20 come into contact, the continued rotation of the bolt will not only cause the interaction of threaded portion 70 with hole 71 to draw the clamp sections closer together, but so will the interaction of ramped surfaces 17 and 20. That is, as the bolt is rotated the contact between ramped surfaces 17 and 20 will further drive top 9 toward base 8 (as described above), providing additional clamping force about the surface of the scaffolding tube or pipe.

Figure 51:
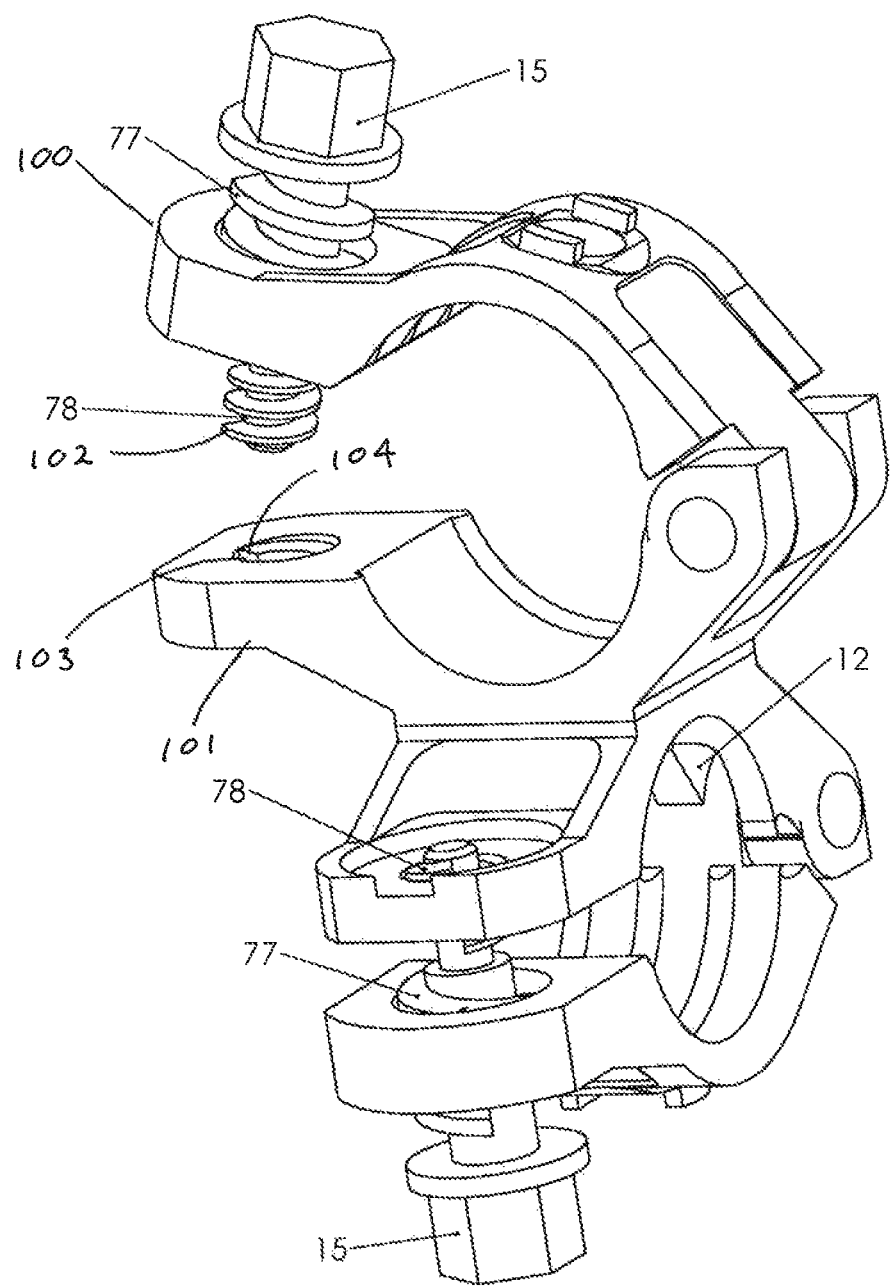
FIG. 51 is a view similar to FIG. 47 wherein the scaffolding tube clamp is equipped with a twin speed threaded bolt.
Figure 52:
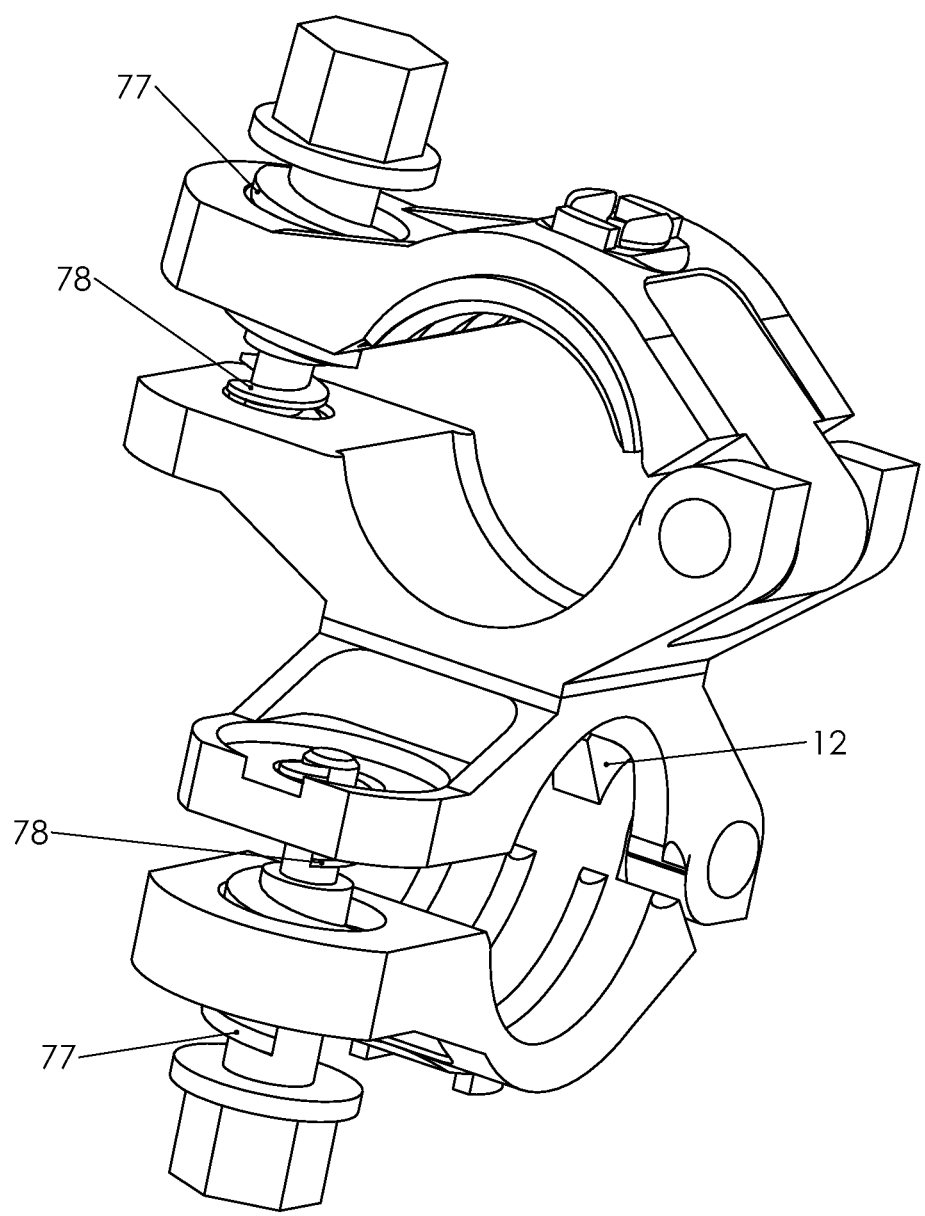
FIG. 52 is a view similar to FIG. 51 wherein each of the scaffolding tube bolts have been partially engaged with their respective bases.
Figure 53:
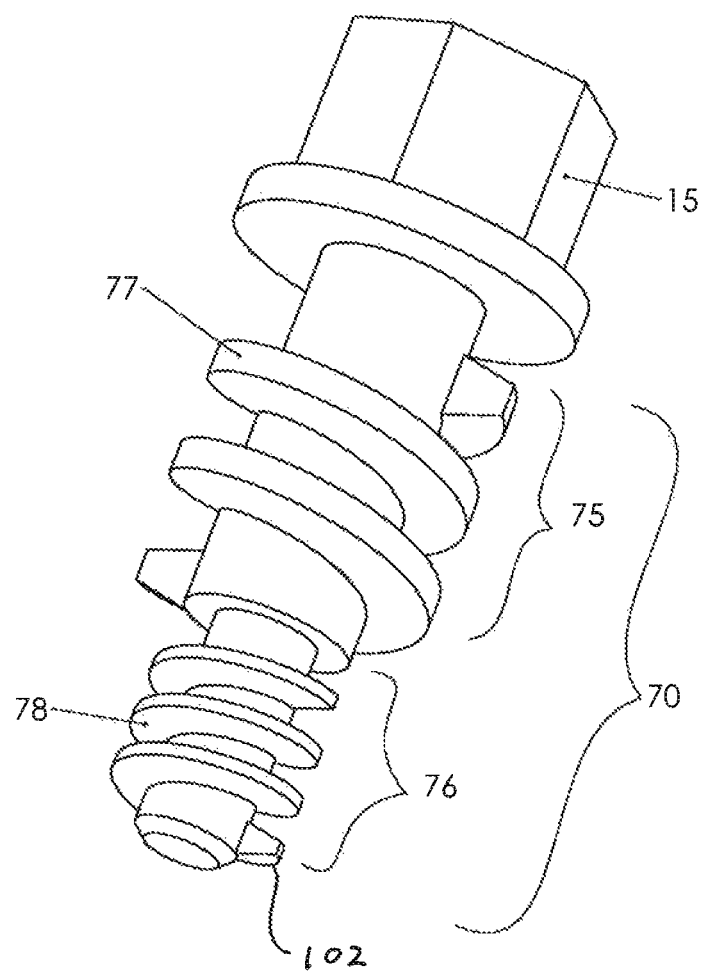
FIG. 53 is a lower perspective view of the twin speed bolt of the embodiment shown in FIG. 51.

FIGS. 51 through 53 show a slight variation to the embodiment of FIGS. 47 through 50, wherein bolt 15 has a first or upper threaded portion 75 and second or lower threaded portion 76. In the depicted embodiment, upper threaded portion 75 has a larger diameter thread 77 than the thread 78 on lower threaded portion 76.

With a bolt 15 of this construction, top 9 will be fitted with a hole having a thread corresponding to larger diameter thread 77 and base 8 will have a hole having a thread corresponding to smaller diameter thread 78. When top 9 and base 8 are received about the exterior surface of a scaffolding tube, rotation of bolt 15 will then result in thread 77 engaging the correspondingly threaded hole in top 9 and thread 78 engaging the correspondingly threaded hole in base 8.

Preferably, larger diameter thread 77 and smaller diameter thread 78 will have different pitches. In the particular embodiment shown, large diameter thread 77 has a coarse thread whereas small diameter thread 73 has a finer thread. Rotation of bolt 15 will thus result in the courser 77 causing top 9 to be drawn toward base 8 with minimal bolt rotation to allow the clamp to be secured about the scaffolding tube in an expeditious manner. At the same time, the finer thread 78 provides for enhanced strength and also will tend to provide better vibration resistance than the course thread portion. It will be appreciated that the relative positions of the large and small diameter threaded sections of bolt 15 could be reversed, as could the relative positions of the coarse and fine threads.

With specific reference to FIGS. 51 and 53, it will be appreciated that, in one non-limiting embodiment, the second end of top 9 includes a first flange 100, and the second end of base 8 includes a second flange 101, where the first opening or hole in the second end of top 9 extends through the first flange 100, and the second complimentary opening or hole in the second end of base 8 extends through the second flange 101. Further, the smaller diameter thread 78 on bolt 15 includes an indexing tab or leading edge 102 positioned at the lower end of the bolt 15. The indexing tab 102 is receivable through a complimentary shaped indexing opening 103, which is formed through an abrupt termination 104 of the thread corresponding to smaller diameter thread 78 within the second hole in the second end of base 8. More particularly, the indexing tab 102 is receivable through the indexing opening 103 when the lower end of the bolt 15 is initially and partially received within the second hole of base 8. The insertion of bolt 15 into the second hole thus requires an initial alignment of indexing tab 102 with indexing opening 103. As shown in FIG. 51, indexing tab 102 is aligned with indexing opening 103 when head 19 of bolt 15 is set-off from the first flange 100 on the second end of top 9, and when the upper threaded portion 75 is only partially engaged with the threads in the first hole in the second end of top 9, thereby providing a sufficient amount of both larger diameter thread 77 and smaller diameter thread 78 to enable the rotation of bolt 15 to draw top 9 toward base 8 to clamp about a scaffolding tube before the head 19 of bolt 15 bottoms out against the first flange 100.

It is to be understood that what has been described are the preferred embodiments of the invention. The scope of the claims should not be limited by the preferred embodiments set forth above, but should be given the broadest interpretation consistent with the description as a whole.

I claim:

1. A scaffolding tube clamp comprising:
   at least one pair of body portions, each pair of body portions comprising a base and a top, each base and top having a first end hingedly connected to one another to permit the base and top to be capable of being rotatably received about an exterior surface of a scaffolding tube,
   a rotatable bolt engageable with a first hole extending through a first flange positioned at a second end of the top and engageable with a second hole extending through a second flange positioned at a second end of the base, when the bolt is engaged with the first and second holes rotation of the bolt in a first direction connects the second ends of the top and base and moves the second ends closer to one another in a clamping arrangement about a scaffolding tube received therebetween, and rotation of the bolt in a second opposite direction releases the connection between the second ends of the top and the base permitting their rotational movement about the hinged connection,
   the bolt having a head and a threaded shaft, the shaft having a first threaded portion with a first thread located adjacent to the head, the shaft having a second threaded portion with a second thread at a lower end of the bolt, the first hole having threads complimentary to the first thread and the second hole having threads complimentary to the second thread, the first and second threads having different pitches, the first and second threads having opposite pitch directions,
   wherein the second thread comprises an indexing tab at the lower end of the bolt, the indexing tab receivable through a complimentary shaped indexing opening within the second hole when the lower end of the bolt is initially and partially received within the second hole, the indexing tab aligning the second thread for engagement with the threads in the second hole when the head is set-off from the first flange and when the first threaded portion is only partially engaged with the threads in the first hole.

2. The scaffolding tube clamp as claimed in claim 1 wherein the first threaded portion has a larger diameter than the second threaded portion.

3. The scaffolding tube clamp as claimed in claim 2 wherein the first threaded portion has a coarser thread than the second threaded portion.

4. The scaffolding tube clamp as claimed in claim 3 wherein rotation of the bolt through a 360 degree revolution causes the bolt to move either inwardly or outwardly through the second hole by at least 8 mm.

5. The scaffolding tube clamp as claimed in claim 1 wherein the top includes a tab on an interior surface adjacent to its hinged connection to the base, the tab capable of being engaged by the scaffolding tube when received between the top and the base, wherein insertion of the scaffolding tube between the top and the base causes an engagement of the tab with the scaffolding tube and causes the second end of the top to be rotated toward the second end of the base.

6. The scaffolding tube clamp as claimed in claim 1 wherein the complementary shaped indexing opening within the second hole is formed through an abrupt termination of the thread of the second hole.

7. A pair of scaffolding tube clamps as claimed in claim 1 fixed together at 90 degrees to one another.

* * * * *